(12) United States Patent
Isoda

(10) Patent No.: US 7,363,405 B2
(45) Date of Patent: Apr. 22, 2008

(54) COMMUNICATION CONTROL APPARATUS AND METHOD

(75) Inventor: Takashi Isoda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 10/185,233

(22) Filed: Jun. 28, 2002

(65) Prior Publication Data

US 2003/0005106 A1 Jan. 2, 2003

Related U.S. Application Data

(63) Continuation of application No. PCT/JP01/09505, filed on Oct. 30, 2001.

(30) Foreign Application Priority Data

Oct. 31, 2000 (JP) ............................. 2000-332891

(51) Int. Cl.
*G06F 13/42* (2006.01)
*G06F 13/40* (2006.01)
*G06F 13/14* (2006.01)

(52) U.S. Cl. ..................... 710/105; 710/104
(58) Field of Classification Search ............... 710/11, 710/16, 33, 305, 104–105; 370/489–490
See application file for complete search history.

(56) References Cited

U.S. PATENT DOCUMENTS

| | | | |
|---|---|---|---|
| 5,809,331 A | 9/1998 | Staats et al. | 710/10 |
| 5,968,152 A * | 10/1999 | Staats | 710/104 |
| 5,991,842 A | 11/1999 | Takayama | 710/105 |
| 6,003,065 A | 12/1999 | Yan et al. | 709/201 |
| 6,160,796 A | 12/2000 | Zou | 370/257 |
| 6,182,094 B1 | 1/2001 | Humpleman et al. | 715/513 |
| 6,185,632 B1 | 2/2001 | Berkema | 710/20 |
| 6,198,479 B1 | 3/2001 | Humpleman et al. | 345/733 |
| 6,519,656 B2 | 2/2003 | Kondo et al. | 710/6 |
| 6,523,696 B1 | 2/2003 | Saito et al. | 709/223 |

(Continued)

FOREIGN PATENT DOCUMENTS

CN 1167230 1/2003

(Continued)

OTHER PUBLICATIONS

LeClair et al.; "P1394.3 Draft Standard for a High Performance Serial Bus Peer-to-Peer Data Transport Protocol (PPDT)"; IEEE; Jul. 29, 2000; Draft 2.0.*

(Continued)

*Primary Examiner*—Paul R. Myers
*Assistant Examiner*—Ryan M Stiglic
(74) *Attorney, Agent, or Firm*—Fitzpatrick, Cella, Harper & Scinto

(57) ABSTRACT

An initiator has logical devices A, B and C. In the directory structure of the config ROM showing the unit structure, instance directories A, B and C are made; initiator unit directories 1, 2, and 3 are made under the respective instance directories A, B and C; and feature directories showing the functions provided by the respective logical devices are made under the initiator unit directories 1, 2, and 3. This structure allows the functions available from the initiator to be shown and allows the available functions to be known to another node such as a target device.

9 Claims, 36 Drawing Sheets

U.S. PATENT DOCUMENTS

| | | | |
|---|---|---|---|
| 6,667,992 B1 | 12/2003 | Yanagawa | 370/490 |
| 6,671,768 B1 | 12/2003 | Brown | 711/102 |
| 6,725,311 B1 | 4/2004 | Joy et al. | 710/305 |
| 6,760,804 B1 | 7/2004 | Hunt et al. | 710/313 |
| 6,775,244 B1 | 8/2004 | Hattig | 370/257 |
| 6,788,882 B1 | 9/2004 | Geer et al. | 386/118 |
| 6,801,507 B1 | 10/2004 | Humpleman et al. | 370/257 |
| 6,813,663 B1 * | 11/2004 | Brown | 710/104 |
| 2001/0021492 A1 | 9/2001 | Sato | 709/213 |
| 2001/0042142 A1 | 11/2001 | Fukunaga et al. | 710/11 |
| 2002/0078293 A1 | 6/2002 | Kou et al. | 710/305 |
| 2002/0152337 A1 | 10/2002 | Kondo et al. | 710/33 |
| 2002/0194417 A1 | 12/2002 | Suzuki et al. | 710/305 |
| 2003/0041195 A1 | 2/2003 | Isoda | 710/104 |
| 2003/0069979 A1 | 4/2003 | Horiguchi | 709/227 |
| 2003/0158979 A1 | 8/2003 | Tateyama et al. | 710/33 |
| 2003/0202539 A1 | 10/2003 | Fukunaga et al. | 370/489 |
| 2003/0212850 A1 | 11/2003 | Nagasaka | 710/305 |
| 2004/0148446 A1 | 7/2004 | Katsch | 710/104 |

FOREIGN PATENT DOCUMENTS

| | | |
|---|---|---|
| EP | 0 279 232 | 1/1988 |
| EP | 0 949 782 | 10/1999 |
| EP | 996069 | 4/2000 |
| EP | 1 056 021 | 11/2000 |
| EP | 1 071 255 | 1/2001 |
| JP | 5-044693 | 7/1993 |
| JP | 10-023097 | 1/1998 |
| JP | 11-154123 | 6/1999 |
| JP | 2000-151664 | 5/2000 |
| JP | 2000-253463 | 9/2000 |
| JP | 2001-086195 | 3/2001 |
| JP | 2001-148706 | 5/2001 |
| WO | WO 00/01191 | 6/2000 |
| WO | WO 01/08151 | 2/2001 |

OTHER PUBLICATIONS

Batchelder et al.; "P1212 Draft Standard for a Control and Status Register (CSR) Architecture for microcomputer buses"; Institute of Electrical and Electronics Engineers, Inc; Draft 1.0; Oct. 18, 1999.*

LeClair et al.; "1394.3 IEEE Standard for a High Performance Serial Bus Peer-to-Peer Data Transport Protocol (PPDT)";The Institute of Electrical and Electronics Engineers, Inc.; Apr. 2004; p. 41.*

A. Paskins, "The IEEE 1394 Bus", May 12, 1997, IEEE Half-Day Colloquium on New High Capacity Digital Media and Their Applications (Digest No. 1997/114) pp. 4/1-4/6.

C. Severance, "Linking Computers and Consumer Electronics", Feb. 1997, IEEE Computer, vol. 30, Issue 2, pp. 119-121.

R. Santamaria, "IEEE-1394: A Standard for the Next Millenium," Oct. 24-29, 1999, IEEE Digital Avionics Systems Conference, vol. 1, pp. 1.C.2-1-1.C.2-7.

J.F. Kovar, "Printers to Get FireWire Specification," Mar. 2, 2000, TechWeb, pp. 1, available at: <http://www.techweb.com/wire/story/TWB20000302S0008>.

"IEEE 1394.3 Set for Final Balloting as Official Printer Standard," Mar. 1, 2000, Business Wire, pp. 1-2, available at: <http://www.findarticles.com>.

"IEEE 1394.3 Peer-to-Peer Data Transport Technology to Enable New Printer, Imaging Devices using 1394 Multimedia Bus," Mar. 6, 2000, Business Wire, p. 1, available at: <http://www.findarticles.com>.

"IEEE Standard for High Performance Serial Bus," The Institute of Electrical and Electronics Engineers, Inc., IEEE Std 1394-1995, pp. 227-234.

Mitchell Shnier, Computer Dictionary, 1998, QUE Corporation, pp. 177-178.

"Structure For Controlling Small Computer System Interface Logical Devices In An Independent And Overlapped Manner", IBM Technical Disclosure Bulletin, IBM, Corp., New York, US. vol. 33, No. 1A, pp. 330-332. Jun. 1, 1990.

"Automatic Target Mode For The Small Computer System Interface", IBM Technical Disclosure Bulletin, IBM, Corp., New York, U.S. vol. 33, No. 5, pp. 130-133. Oct. 1, 1990.

J. Howard, et al., "USB Feature Specification: Dynamic Logical-Device", USB Feature Specification: Dynamic Logical-Device, pp. 1-14, Oct. 27, 1999.

* cited by examiner

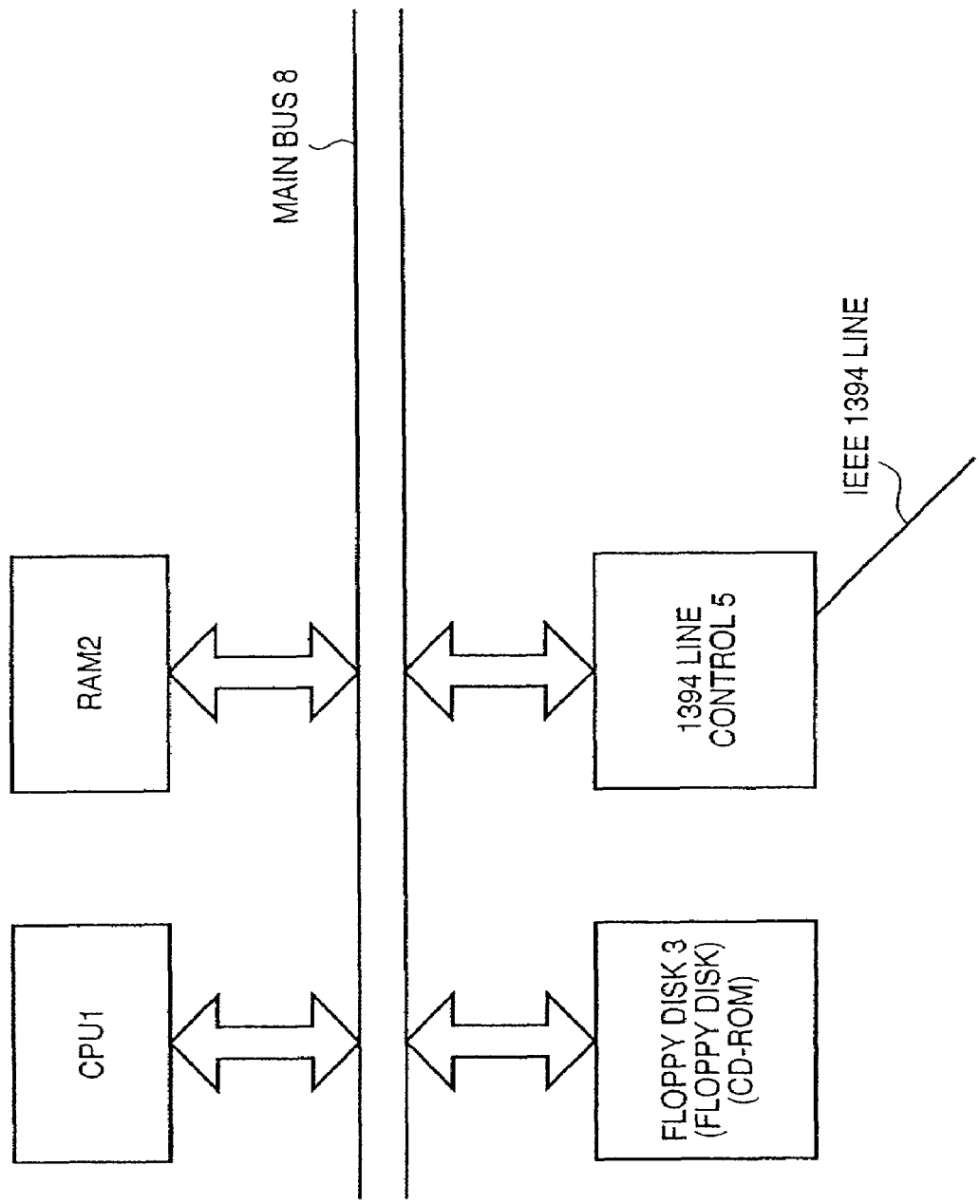

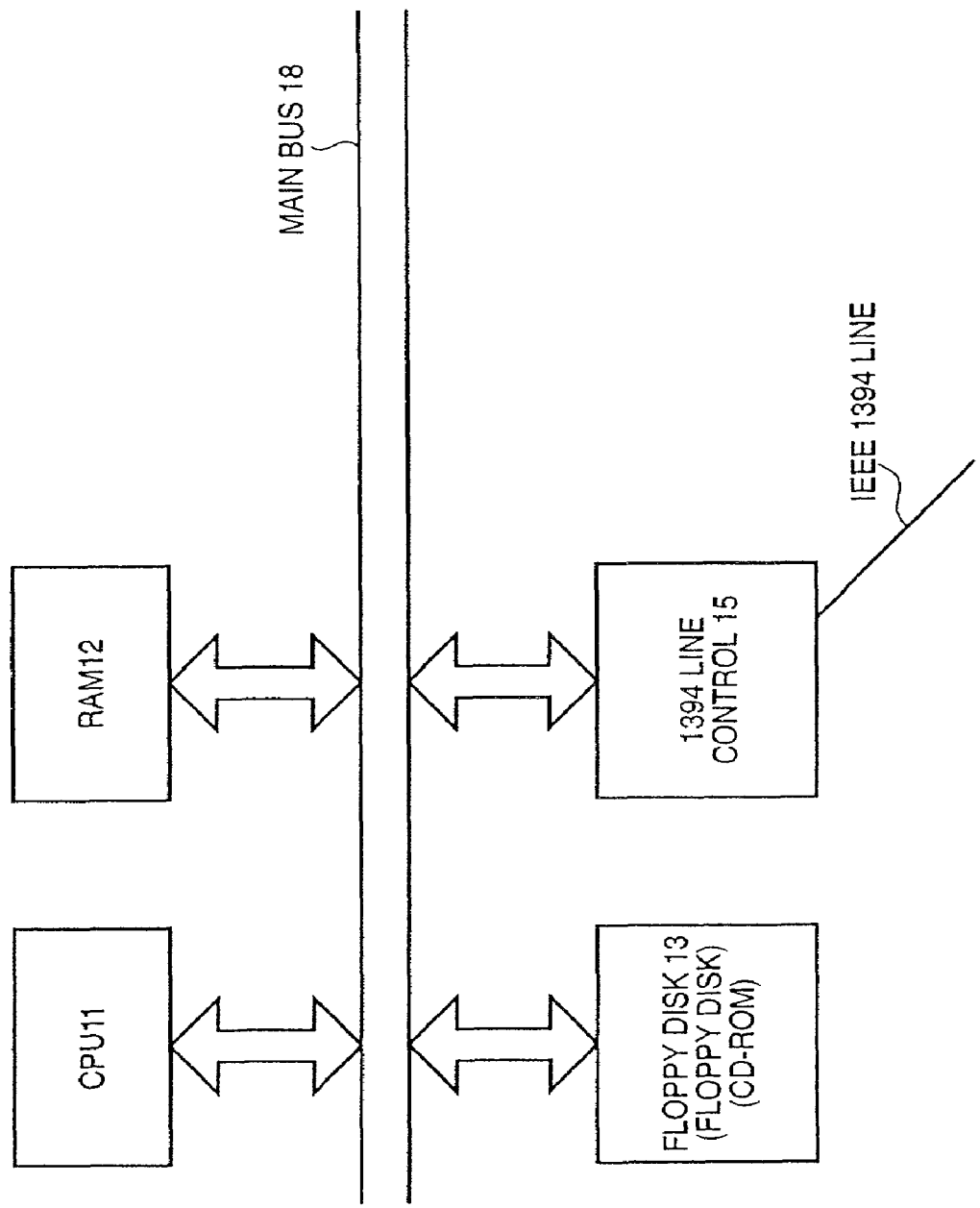

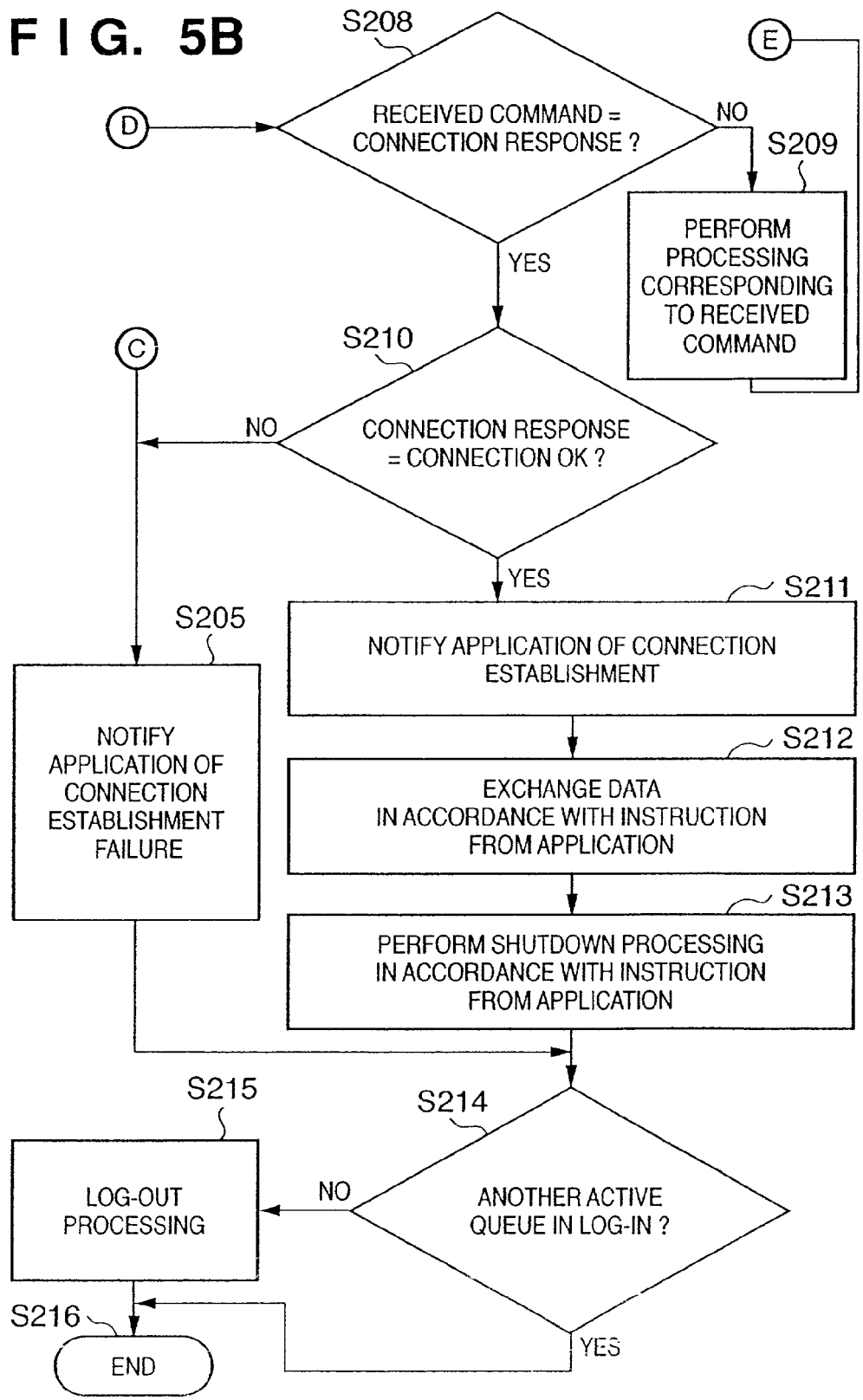

Rq              REQUEST     (1)
ctrl_FUNCTION   CONNECT     (1)
RESPONSE        DON'T CARE
TASK_SLOTS, I2T_QUEUE, MODE, AND SERVICE_ID COMPLY
WITH IEEE 1394.3

MOST SIGNIFICANT

| Rq | ctrl_FUNCTION | RESPONSE | RESERVED |
|---|---|---|---|
| TASK_SLOTS | | 5 | |
| I2T_QUEUE | | 4 | |
| MODE | | 0 | |
| SERVICE_ID | | 3 | |
| DIRECTORY_ID | 2 F | 4 2 | 5 6 |
| P | R | N | 0 0 |

LEAST SIGNIFICANT

Rq             REQUEST    (1)
ctrl_FUNCTION  CONNECT    (1)
RESPONSE       DON'T CARE
TASK_SLOTS, I2T_QUEUE, MODE, AND SERVICE_ID COMPLY
WITH IEEE 1394.3
DIRECTORY_ID COMPLIES WITH DEFINITION IN THE DRAWING

FIG. 11
MOST SIGNIFICANT
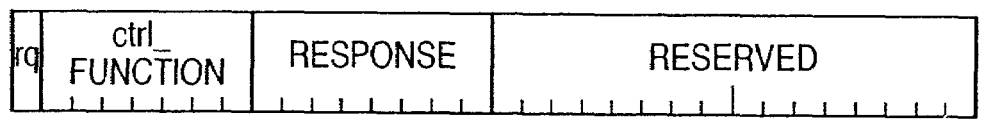
Rq           RESPONSE   (0)
ctrl_FUNCTION  CONNECT    (1)
RESPONSE     OK (0)

Rq  
ctrl_FUNCTION  
RESPONSE

RESPONSE (0)  
CONNECT (1)  
7

FIG. 14

| PARAMETER ID | PARAMETER NAME | VALUE | DESCRIPTION |
|---|---|---|---|
| 0 | | 0 | REPRESENTS END OF PARAMETER LIST IN CONTROL INFORMATION (OPTION). |
| 1 | TASK_SLOTS | 1 PER QUEUE AT MINIMUM | MAXIMUM NUMBER OF ALLOWABLE ORBs IN TASK SET FOR SPECIFIC CONNECTION. INITIATOR CAN PROVIDE THIS PARAMETER IN ORDER TO MONITOR RESTRICTION POSED BY TARGET AND DISPLAY RESTRICTION POSED BY INITIATOR. TASK SLOT IS ASSIGNED EVERY CONNECTION AND CAN BE USED FOR ANY CONNECTION QUEUE. |
| 2 | I2T_QUEUE | NONZERO: $FF_{16}$ AT MAXIMUM | QUEUE NUMBER ASSIGNED TO CONNECTION FOR TRANSFERRING APPLICATION DATA FROM INITIATOR TO TARGET. |
| 3 | T2I_QUEUE | | QUEUE NUMBER ASSIGNED TO CONNECTION FOR TRANSFERRING APPLICATION DATA FROM TARGET TO INITIATOR. |
| 4 | MODE | 0, 1 | SPECIFIES DESIRED MODE WHEN CONNECTION TO GIVEN SERVICE IS ESTABLISHED. 0 SPECIFIES DATAGRAM MODE, AND 1 SPECIFIES STREAM MODE. |
| $5_{16}$ | DIRECTORY_ID | 24 BITS | SPECIFIES UNIT DIRECTORY OF UNIT IN INITIATOR WHICH TARGET TRIES TO CONNECT. THIS VALUE IS ADDRESS OF UNIT DIRECTORY OR DIRECTORY_ID CONTAINED IN UNIT DIRECTORY WHICH TARGET TRIES TO CONNECT. |
| $80_{16}$ | SERVICE_ID | 40 BYTES AT MAXIMUM | ASCII CHARACTER STRING WHICH IDENTIFIES EACH SERVICE (EXCEPT START AND END BLANKS). |
| $81_{16}$ | QUEUE INFORMATION | | BITMAP WHICH REPORTS PENDING STATE OF TARGET DATA FOR QUEUE OTHER THAN CONTROL. |

FIG. 15

| RESPONSE | DEFINITION |
|---|---|
| 0 | REQUEST COMPLETION OK; RESPONSE PARAMETER IS SIGNIFICANT. |
| 1 | UNKNOWN CONTROL FUNCTION |
| 2 | LACK OF RESOURCE WHICH CAN BE USED TO COMPLETE REQUEST; REQUEST CAN BE SUCCESSFUL BY RESENDING SAME REQUEST LATER. |
| 3 | SERVICE IDENTIFIED BY SERVICE_ID PARAMETER DOES NOT EXIST. |
| 4 | QUEUE PARAMETER IN CONNECTION REQUEST MISMATCHES PARAMETER PREDICTED FROM SERVICE. |
| 5 | CONNECTION REQUEST IS REJECTED. |
| 6 | UNIT DIRECTORY IDENTIFIED BY DIRECTORY_ID PARAMETER DOES NOT EXIST. |
| 7 | UNIT SPECIFIED BY DIRECTORY_ID PARAMETER DOES NOT SUPPORT SERVICE IDENTIFIED BY SERVICE_ID. |
| $FF_{16}$ | IDENTIFICATION ERROR |

FIG. 17

| DIRECTORY ENTRY | | | |
|---|---|---|---|
| NAME | TYPE | ESSENTIAL | DESCRIPTION |
| SPECIFIER_ID | 1 | Y | BY SPECIFIER_ID AND VERSION, STANDARD IS IDENTIFIED AS DOCUMENT WHICH SPECIFIES BASIC SOFTWARE. |
| VERSION | 1 | Y | |
| DIRECTORY_ID | 1 | | DIRECTORY_ID WHOSE FORMAT ID IS DEFINED BY IEEE 1212r. |
| FEATURE_DIRECTORY | D | | ADDITIONAL INFORMATION WHICH DESCRIBES FUNCTION (GENERALLY INDEPENDENT OF SOFTWARE INTERFACE AND COMMAND SET) OF UNIT. |

SPECIFIER_ID ENTRY     24-BIT VALUE     00 5029$_{16}$,
VERSION ENTRY,         24-BIT VALUE     1

| Rq | RESPONSE | (0) |
| ctrl_FUNCTION | CONNECT | (1) |
| RESPONSE | 5 | |

F I G. 19
(PRIOR ART)

MOST SIGNIFICANT

| 3 | FEATURE DIRECTORY CRC (CALCULATED) |
|---|---|
| $12_{16}$ | SPECIFIER_ID ( 00 5029$_{16}$ ) |
| $13_{16}$ | VERSION (0) |
| $9A_{16}$ | FEATURE DIRECTORY OFFSET |

LEAST SIGNIFICANT (PRIOR ART)

FIG. 20

MOST SIGNIFICANT

| 3 | FEATURE DIRECTORY CRC (CALCULATED) |
|---|---|
| $12_{16}$ | SPECIFIER_ID ( 00 5029$_{16}$ ) |
| $13_{16}$ | VERSION (0) |
| $B0_{16}$ | SERVICE ID LEAF OFFSET (1) |
| 1 | SERVICE ID LEAF CRC (CALCULATED) |
| 53 5643$_{16}$ ( ASCII "SVC" ) | 0 |

LEAST SIGNIFICANT

COMMUNICATION CONTROL APPARATUS AND METHOD

This application is a continuation of International Patent Application No. PCT/JP01/09505, filed Oct. 30, 2001, and published on May 10, 2002 in the Japanese (not English) language as International Publication No. WO 02/37769 A1.

FIELD OF THE INVENTION

The present invention relates to a communication control apparatus and method for controlling data transfer between two devices and, more particularly to a communication control apparatus and method using IEEE 1394 as a communication protocol.

BACKGROUND OF THE INVENTION

One of communication protocols defined by IEEE (Instituted of Electrical and Electronics Engineers) is IEEE 1394. A communication scheme defined by IEEE 1394 realizes higher-speed bidirectional communication, compared to a handshake scheme. A device connected by an IEEE 1394 serial bus which is a memory bus model interface can access an address designated by a partner. IEEE 1394 defines the protocols of physical and link layers for wider applications, and does not define detailed protocols for each device.

An SBP-2 (Serial Bus Protocol-2) protocol is defined as the protocol of a transport layer utilizing IEEE 1394 as the physical/link layer. SBP-2 fully exploits the features of an IEEE 1394 memory bus model, and a command receiving side can receive data from a transmitting side at the convenience of the receiving side in accordance with SBP-2. Two devices connected by SBP-2 are a command transmitting side called an initiator and a receiving side called a target, and the initiator takes the initiative to start communication. Log-in operation can be performed by only the initiator, and the target operates in response to an action from the initiator in principle.

According to SBP-2, when the initiator logs in, the initiator creates a block ORB which describes a memory address or the like used to exchange data, and notifies the target of the ORB address. The target reads the notified ORB, and reads out data from the described address, or writes data at the address, thereby realizing exchange of data. The ORB address is queued in the target, and its response is queued in the initiator. The target sequentially processes queued ORBs, and sends back responses to the initiator.

An IEEE 1394.3 standard which defines reverse log-in which prompts the initiator from the target to log in is also proposed as a protocol of the transport layer in addition to SBP-2. In IEEE 1394.3, log-in operation can be executed by only the initiator, and the target operates in response to an action from the initiator in principle. However, the target can perform reverse log-in operation which prompts the initiator to log in.

Since the initiator takes the initiative, the standard causes the initiator to provide various services, and the target designates and receives a desired service.

The IEEE 1394 standard assumes that nodes connected to each other constitute one device. This is because IEEE 1394 inherits, e.g., a SCSI definition which assumes each node as a single device in order to eliminate cumbersome management of a plurality of devices within one node.

For this reason, IEEE 1394.3 defines that one physical node (representing a node connected to a 1394 serial bus; to be also referred to as a physical device) has only one initiator unit directory for defining a logical device (unit) at the node of an initiator. This definition inhibits the initiator from having two or more unit directories. If a given physical device has a plurality of logical devices which constitute an IEEE 1394.3 physical device, and plays a role of an initiator, the relationship between the physical device, the logical devices, and services cannot be expressed by a proper hierarchical structure to another device.

FIG. 19 shows an example of the unit directory. IEEE 1394.3 allows each node serving as an initiator defined by IEEE 1394.3 to have only one unit directory with at least entries as shown in FIG. 18. Services providable by the node are described by a description method defined by IEEE 1394.3 in a feature directory at a location whose address is specified by a feature directory offset contained in the unit directory. The node can announce the providable services to another node via IEEE 1394.3. FIG. 20 shows an example of this format.

When each node which can function as an IEEE 1394.3 initiator has the root directory, instance directory, unit directory, and feature directory of the IEEE 1394.3 initiator, an example of the hierarchical structure is shown in FIG. 21. Note that the description methods of the bus information, root directory, and instance directory are defined by IEEE 1212R, and a detailed description thereof will be omitted.

IEEE 1394.3 inhibits each initiator node from having two or more initiator unit directories. There is no method of announcing to another node that a plurality of instances in the initiator can provide the locations of services via IEEE 1394.3 for the respective instances. If a plurality of instances provide services expressed by the same service ID defined by IEEE 1394.3, which of the instances provides a service represented by the service ID cannot be discriminated. FIG. 22 shows an example of the layered structure of directories at the initiator node in this situation. In this manner, the relationship between a physical device, logical devices, and services in an initiator cannot be expressed by a proper hierarchical structure to another device.

If the role of a physical device is a target, the target can have a plurality of unit directories. Even with a plurality of logical devices, they can be hierarchically expressed using unit directories.

A client which uses IEEE 1394.3 as a lower layer must change its behavior depending on whether an IEEE 1394.3 layer is an initiator or target because the method of expressing a logical device and a service provided by it changes depending on whether the IEEE 1394.3 layer of the device is an initiator or target.

SUMMARY OF THE INVENTION

The present invention has been made in consideration of the prior art, and has as its object to provide a communication control apparatus and method which realize the hierarchical expression of logical devices in an initiator by setting unit directories in correspondence with the logical devices when the initiator has a plurality of logical devices.

To achieve the above object, the present invention has the following arrangement.

There is provided a communication control apparatus in which data in a memory of a device can be directly read by another connected device via a communication line by designating an address of the data, and the devices are connected to each other by communication means, wherein at least two attributes depending on a communication protocol ability of the communication means are stored together with storage means for readably storing a function providable by the device via the communication line.

When at least two attributes depending on the communication protocol ability are to be described in a device which adopts a protocol which does not allow describing in each device at least two attributes depending on the communication protocol ability, these at least two device attributes depending on the communication protocol ability can be preferably described using some of items which express communication protocol attributes stored in the storage means.

When IEEE 1394.3 is used as the communication protocol and a role thereof is an initiator, a version item in a unit directory defined by IEEE 1212R is preferably utilized as an attribute item which enables describing these at least two device attributes depending on the communication protocol ability.

It is preferable that when a plurality of attributes depend on the communication protocol, the unit directory which expresses the attributes depending on the communication protocol be permitted to have only one unit directory which describes all items including the version item in accordance with an IEEE 1394.3 definition, and a unit directory which expresses an attribute other than the attributes be permitted to have one or a plurality of unit directories in which only the version item has a specific value different from the IEEE 1394.3 definition and another item complies with the IEEE 1394.3 definition.

It is preferable that a unit directory which corresponds to only one attribute depending on the communication protocol and can communicate with a target complying with IEEE 1394.3 be described including a version item in accordance with the IEEE 1394.3 definition, and another attribute be described by a unit directory in which only the version item has a specific value different from the IEEE 1394.3 definition and another item complies with the IEEE 1394.3 definition.

There is provided a communication control method in a communication control apparatus in which data in a memory of a device can be directly read by another connected device via a communication line by designating an address of the data, and the devices are connected to each other by communication means, wherein at least two attributes depending on a communication protocol ability of the communication means are stored together with storage means for readably storing a function providable by the device via the communication line.

In addition, a computer-readable memory stores in a computer the computer program which implements any one of the above-described communication control apparatuses.

Alternatively, there is provided a communication control apparatus for providing a service requested of a device connected via a communication line, comprising a plurality of service providing devices, and storage means for storing pieces of information about services provided by the plurality of service providing devices so as to enable reading the pieces of information by another device via the communication line, wherein the pieces of information about the services are constituted by a hierarchical tree structure for each of the plurality of service providing devices.

BRIEF DESCRIPTION OF DRAWINGS

FIG. 5B is a flow chart showing the operation of the target to which the present invention is applied;

FIG. 11 is a view showing the structure of the connection control function (CONNECT) response defined by IEEE 1394.3 when the connection is OK;

FIG. 14 is a table showing connection control function (CONNECT) values extended from the IEEE 1394.3 definition in the present invention, and directory IDs representing extended items in correspondence with the meanings of the extended values;

FIG. 15 is a table showing connection control function (CONNECT) response values extended from the IEEE 1394.3 definition in the present invention, and "6" and "7" representing extended items in correspondence with the meanings of the extended values;

FIG. 17 is a table showing the structure of a unit directory when the present invention is applied;

FIG. 19 is a view showing the structure of a conventional unit directory;

FIG. 20 is a view showing the structure of another conventional unit directory;

DETAILED DESCRIPTION OF THE PREFERRED EMBODIMENTS

First Embodiment

A communication system and an initiator and target which constitute the communication system according to an embodiment of the present invention will be described in detail below with reference to the accompanying drawings. In the following description, a term "complying with a definition of the present invention" or a similar term means merely a restriction by the arrangement or sequence (to be described in the embodiment) of a system, apparatus, or method according to the present invention, and does not represent that the present invention itself is a standard or convention.

<System Configuration>

The first embodiment is schematically as follows. According to the IEEE 1394.3 definition, an initiator unit directory for defining a device (unit) at the node of an initiator has only one physical node (node connected to a 1394 serial bus; also called a physical device). The present invention extends this definition to allow one physical node to have a plurality of initiator unit directories. Each initiator unit directory is assigned an identifier, and if the target must connect a queue defined by IEEE 1394.3 to the initiator, the identifier is added to the parameter of a connection request command as a parameter which designates a logical device. The logical device means each of devices which constitute one physical node. For example, when a computer is a physical node, a local-connected scanner, printer, and modem are respective logical devices.

Figure 3A:
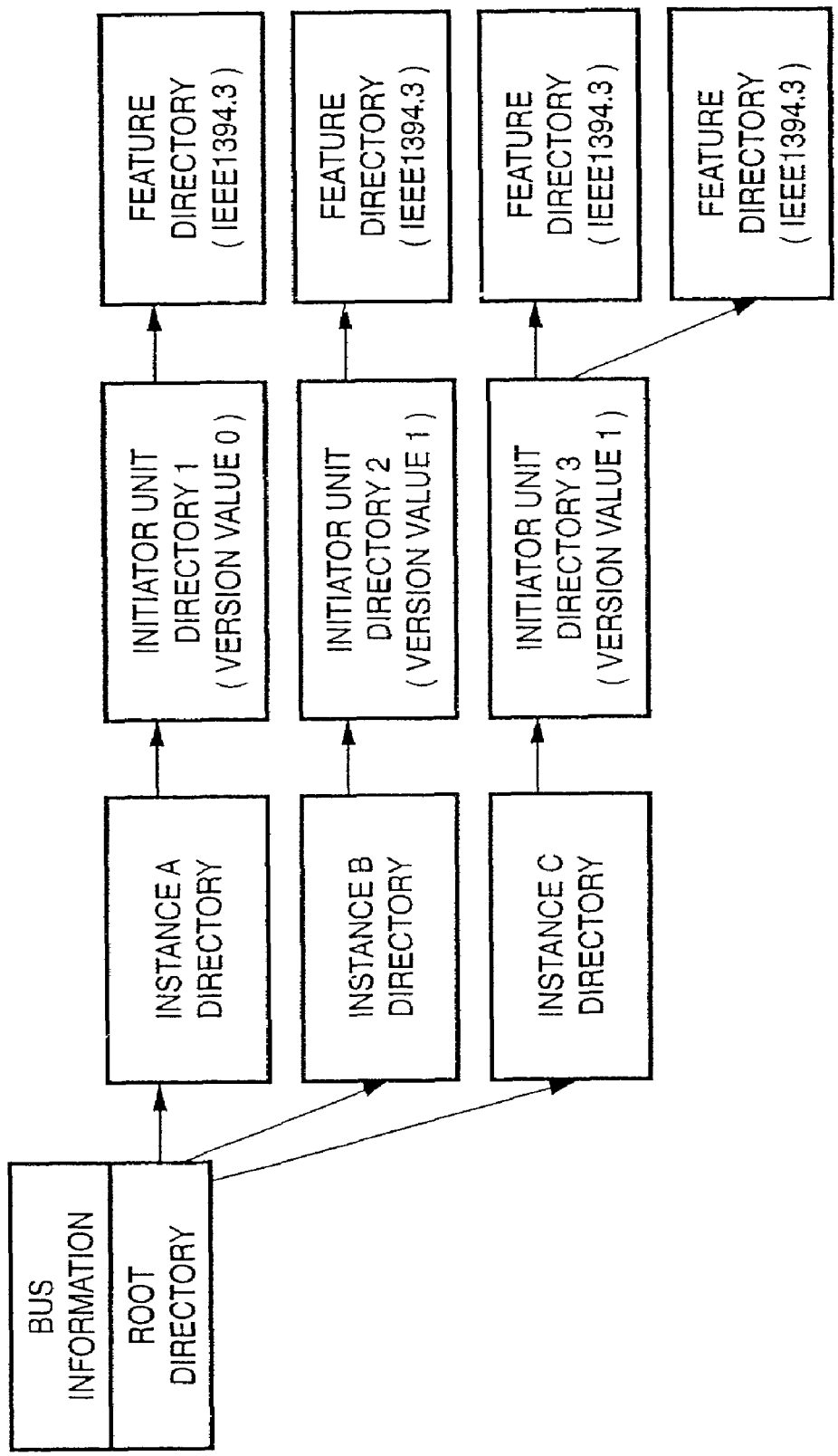
FIG. 3A is a block diagram showing the schematic hierarchy of a config ROM mounted in the initiator to which the present invention is applied.
Figure 3B:
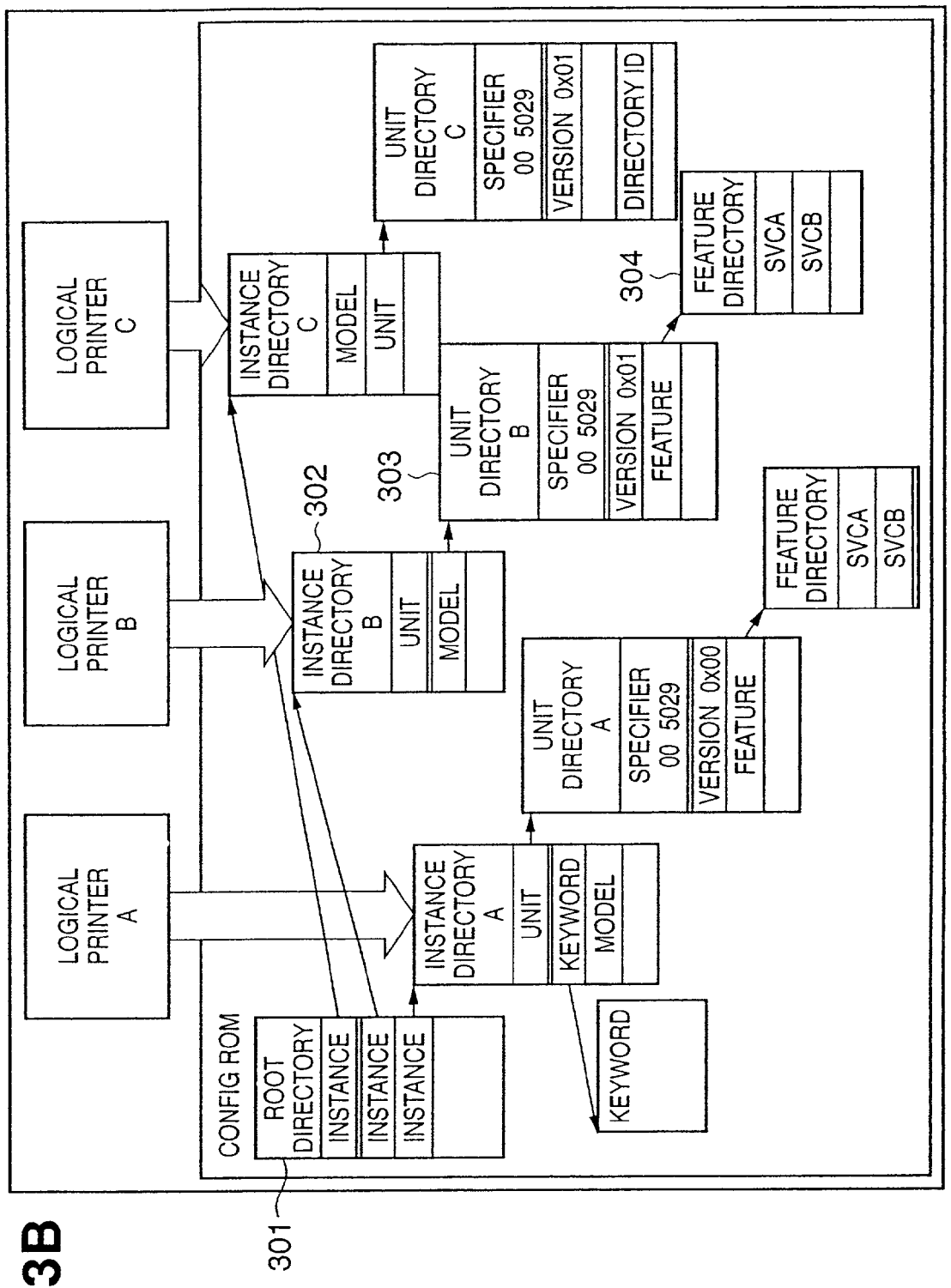
FIG. 3B is a block diagram showing examples of entry values of the config ROM mounted in the initiator to which the present invention is applied.
Figure 16:
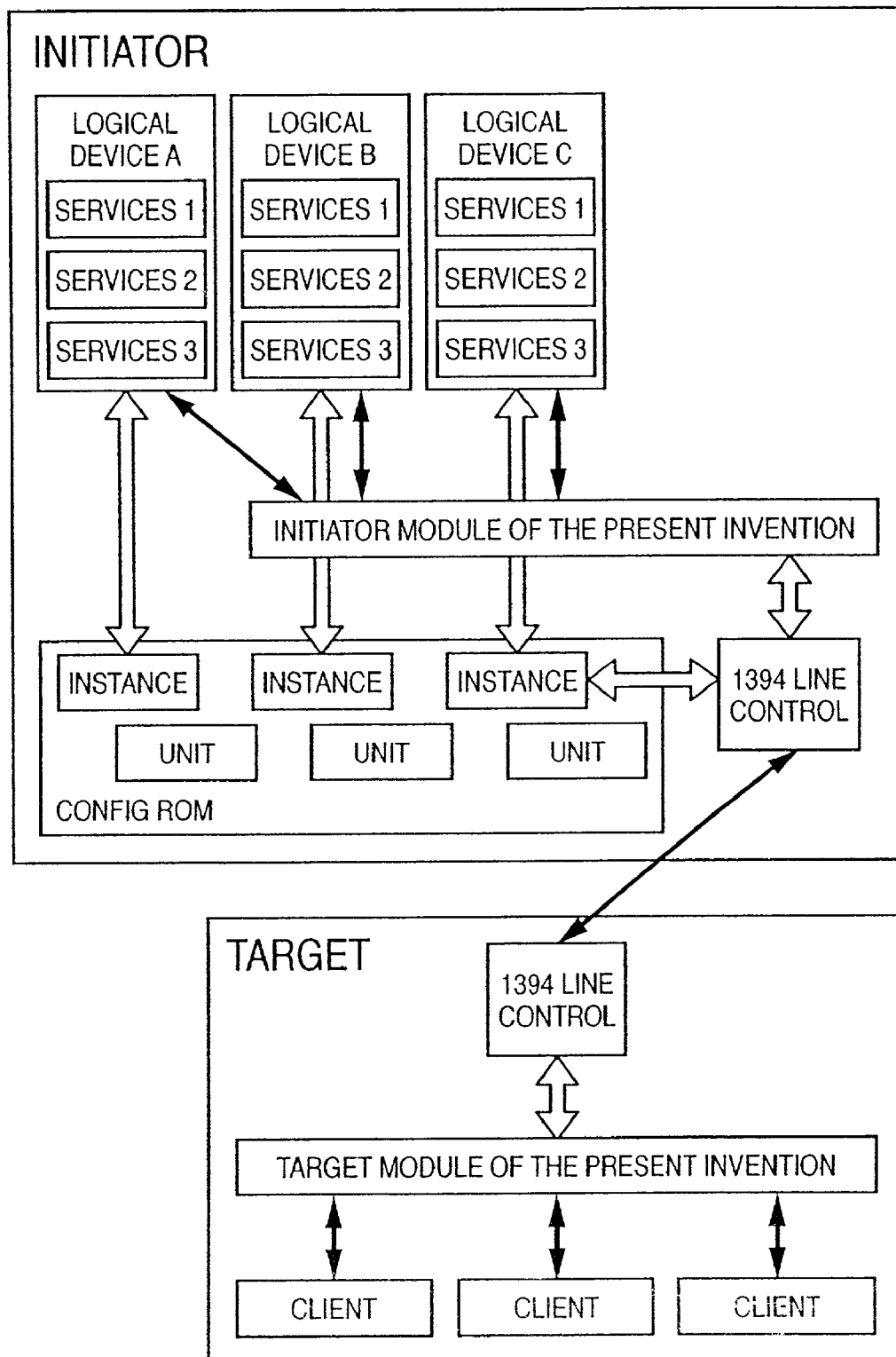
FIG. 16 is a block diagram showing the model of an example of the relationship between the initiator, the target, the config ROM of the initiator, and modules of the present invention when the present invention is applied.
Figure 18:
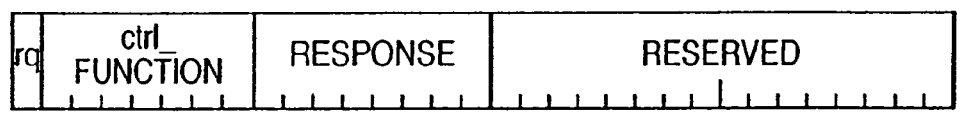
FIG. 18 is a view showing the structure of the connection control function (CONNECT) response defined by IEEE 1394.3 when the connection is rejected.
Figure 21:
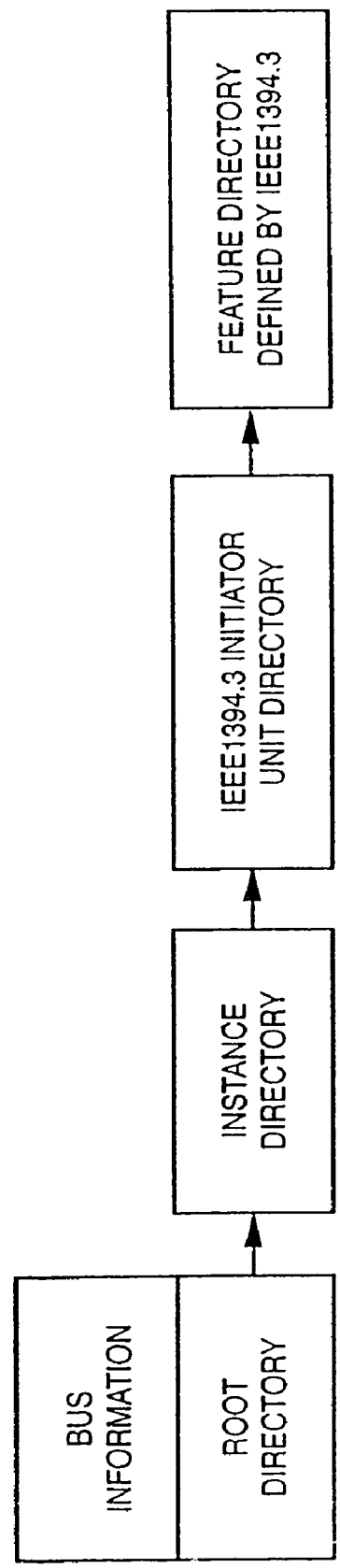
FIG. 21 is a block diagram showing a hierarchical directory structure representing services provided in a conventional initiator.
Figure 22:
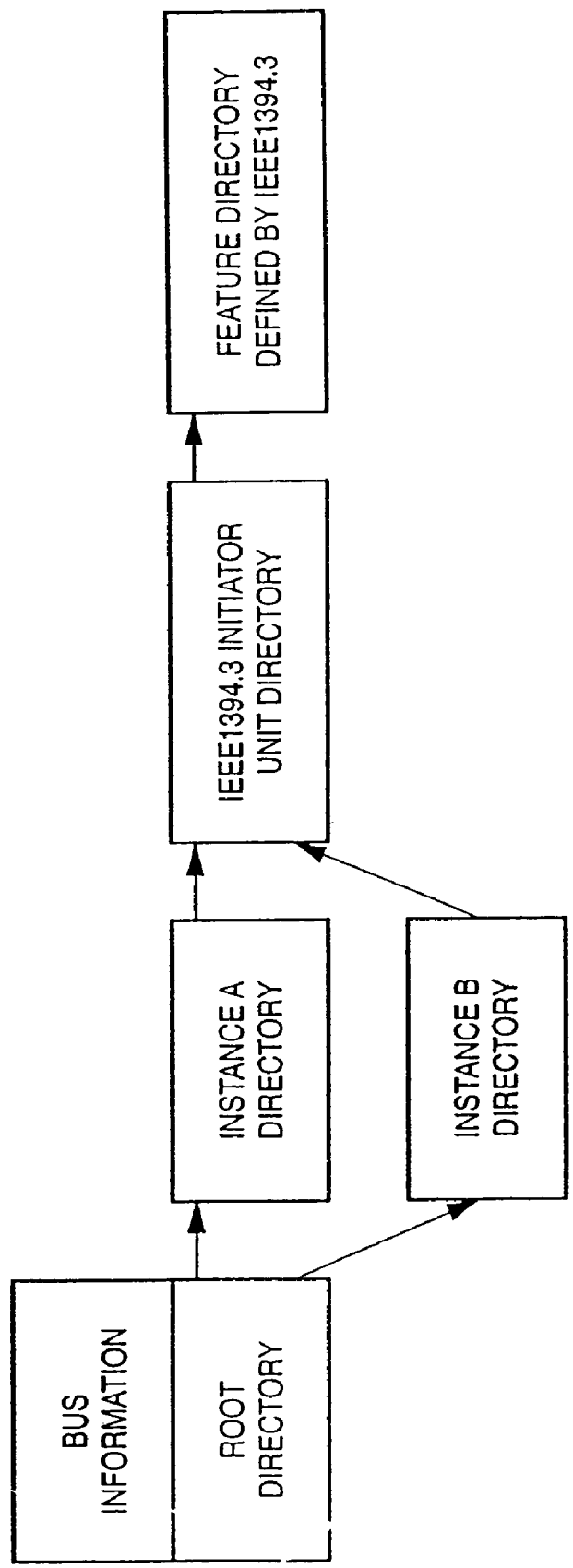
FIG. 22 is a block diagram another hierarchical directory structure representing services provided in a conventional initiator.

FIG. 16 shows a schematic device arrangement to which the present invention is applied. FIGS. 3A and 3B show examples of the internal arrangement of a config ROM in which data defining the arrangement of each node is registered.

In FIG. 16, the initiator of this system comprises logical devices A, B, and C. In this example, the devices are printers. Because of the identical devices, the logical devices provide the same services, e.g., services 1, 2, and 3. The config ROM (CONFIGROM) defines each logical device.

The target has a client which utilizes a service provided by the initiator. The initiator and target are connected by a 1394 serial bus, and connected via 1394 line control units.

Figures 1, 4A:
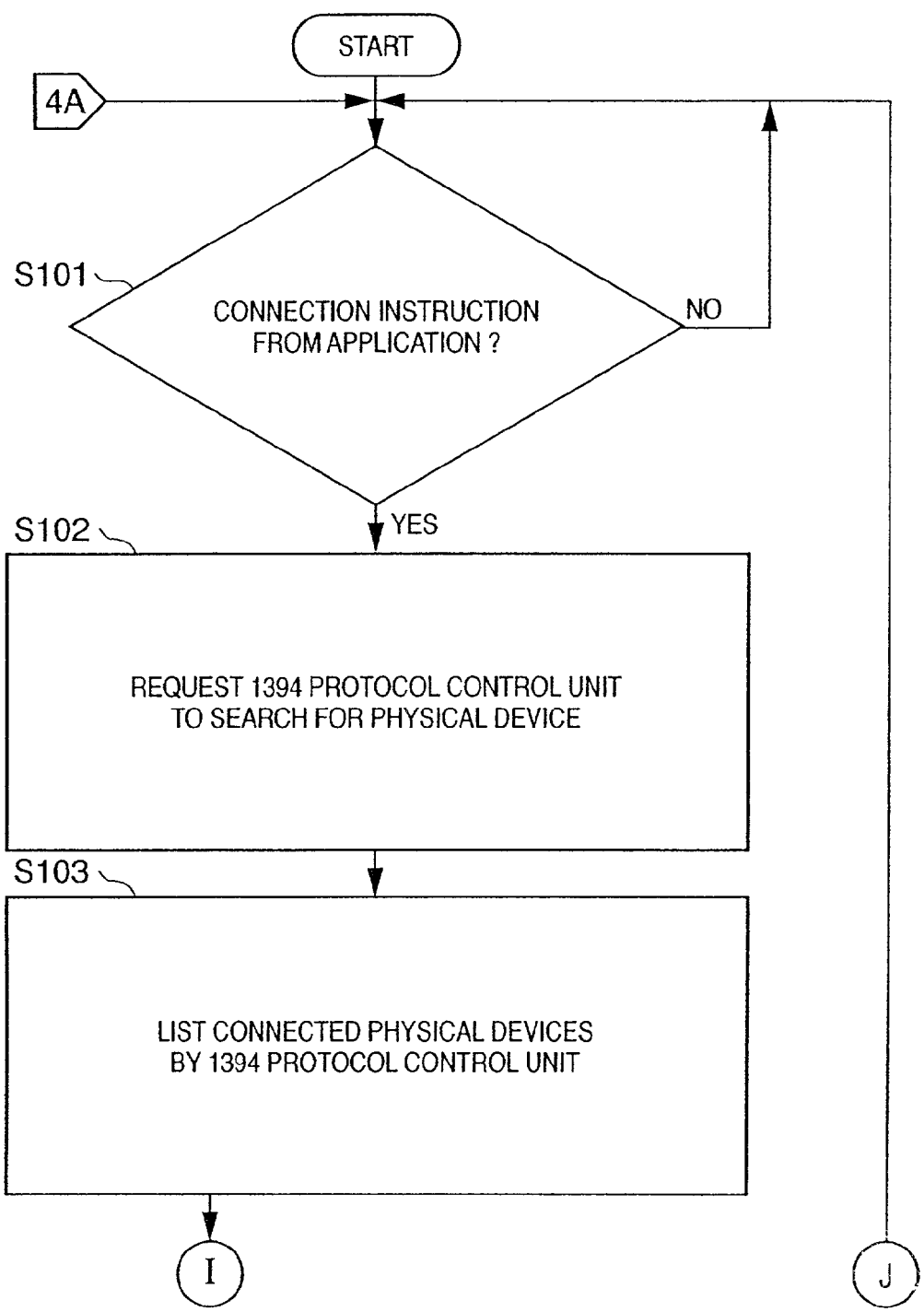
FIG. 1 is a block diagram showing a target to which the present invention is applied.
FIG. 4A is a flow chart showing the operation of the target to which the present invention is applied.

FIG. 1 is a block diagram showing the internal arrangement of a target electronic device defined by IEEE 1394.3 (to be referred to as a target hereinafter) to which the present invention is applied. Reference numeral 1 denotes a CPU which controls the present invention; 2, a RAM which provides the work area of the CPU 1; 3, a hard disk (floppy disk, CD-ROM, MO, ROM, magnetic tape, or the like) which provides the program of the present invention; 5, an IEEE 1394 line control unit; and 8, a main bus.

Figures 2, 4A:
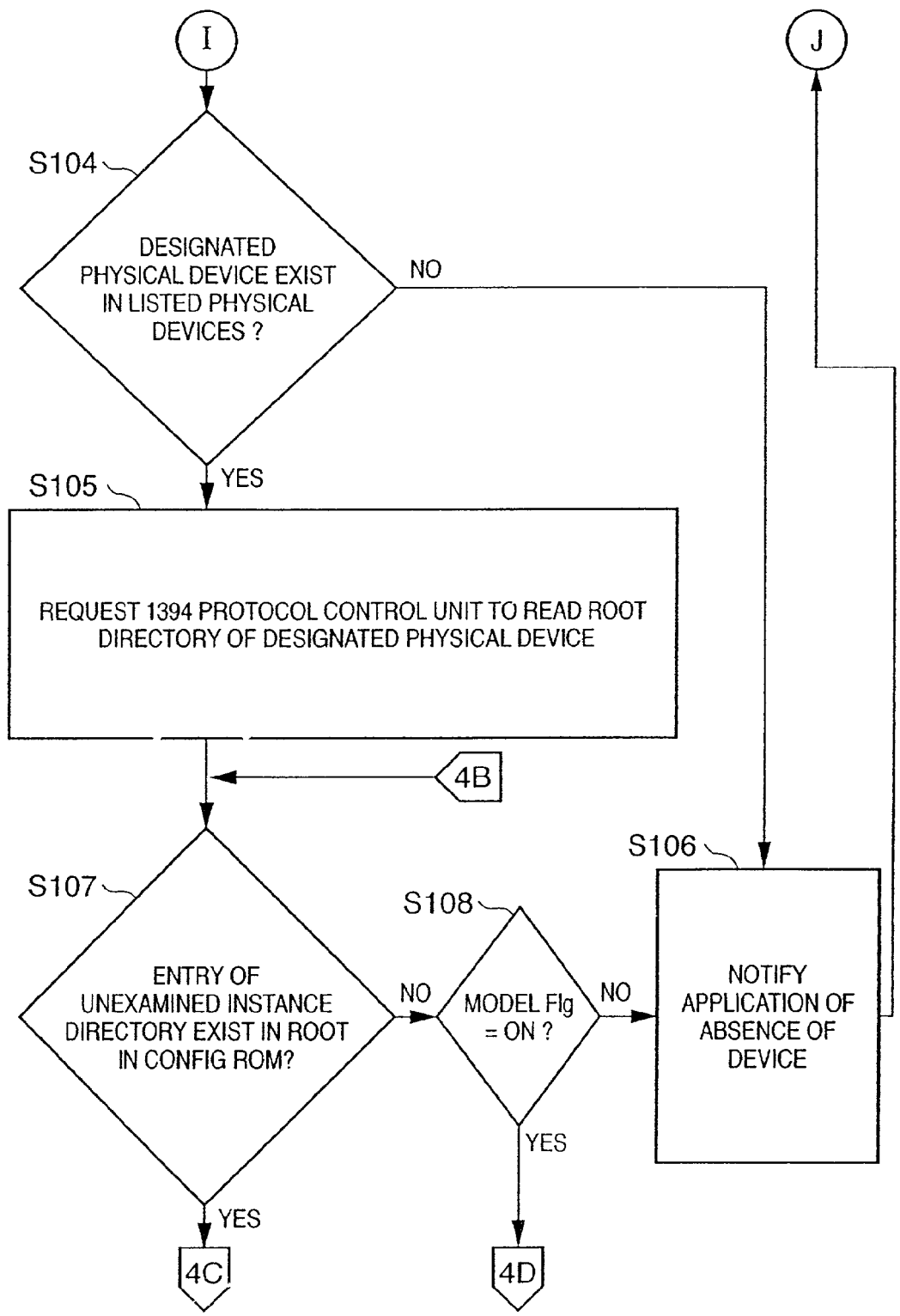
FIG. 2 is a block diagram showing an initiator to which the present invention is applied.

FIG. 2 is a block diagram showing the internal arrangement of an initiator electronic device defined by IEEE 1394.3 (to be referred to as an initiator hereinafter) to which the present invention is applied. Reference numeral 11 denotes a CPU which controls the present invention; 12, a RAM which provides the work area of the CPU 11 (and stores a config ROM); 13, a hard disk (floppy disk, CD-ROM, MO, ROM, magnetic tape, or the like) which provides the program of the present invention; 15, an IEEE 1394 line control unit; and 18, a main bus. The IEEE 1394 line control unit holds protocols defined by IEEE 1394 and SBP-2 (Serial Bus Protocol-2).

In the present invention, the CPUs of both the target and initiator control and operate the RAMs, hard disks, and IEEE 1394 line control units via the main buses in accordance with the program of the present invention, unless otherwise specified. The IEEE 1394 line control unit is also called an IEEE 1394 protocol control unit, which are the same in this embodiment.

<Contents of Config ROM>

FIG. 3A shows an example of the contents of the config ROM of the initiator according to the present invention. Configuration information is managed by directories with a hierarchical structure. An instance directory which defines a logical device lies below a root directory, and a unit directory which defines the logical device in more detail follows the instance directory. A feature directory which defines services and the like provided by each logical device is set below the unit directory.

FIG. 3B shows details of the directories. An instance directory which defines each logical device as an instance is linked below a root directory 301. For example, an instance directory 302 describes the model identifier of printer B serving as a logical device, and has a link to a lower unit directory 303. The unit directory contains a specifier which designates a protocol (in this embodiment, designates 0×5029 representing IEEE 1394), a protocol version, and a link to a feature directory 304 which defines a service. The feature directory 304 defines services A, B, and C which are services provided by logical device B.

It should be noted that initiator unit directory 1 complies with the IEEE 1394.3 definition though the version values of initiator unit directories 2 and 3 are different from the one defined by IEEE 1394.3 and the remaining items comply with the IEEE 1394.3 definition. That is, the version value of the initiator unit directory defined by IEEE 1394.3 is 0, but those of initiator unit directories 2 and 3 are 1. This version number makes it possible to determine whether the current standard is the original IEEE 1394.3 standard or an extended standard described in the embodiment.

Initiator unit directory 3 contains an item DIRECTORY_ID (directory ID) in addition to the features of initiator unit directory 2.

Note that the present invention assumes that the target comprises necessary functions defined by IEEE 1394.3 and the initiator comprises necessary functions. The target and initiator are physically connected by a line defined by IEEE 1394 (see FIG. 16).

<Operation of Target>

The operation of the target according to the present invention will be explained in detail with reference to the flow charts of FIGS. 4A, 4B, 5A, 5B, 6A, and 6B. The operation will be first described with reference to FIGS. 4A and 4B.

Figures 1, 4B:
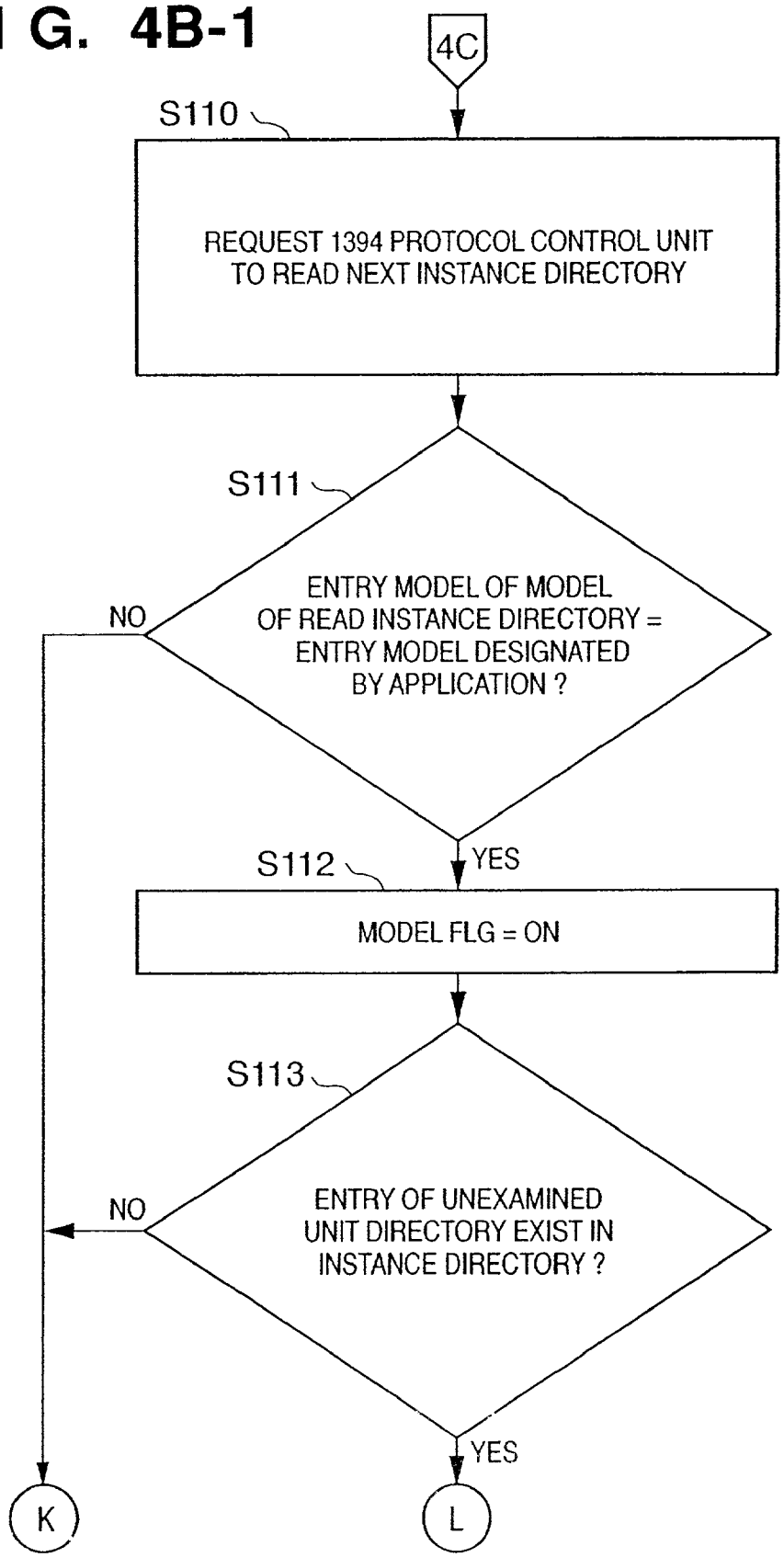
FIG. 4B is a flow chart showing the operation of the target to which the present invention is applied.
Figures 2, 4B:
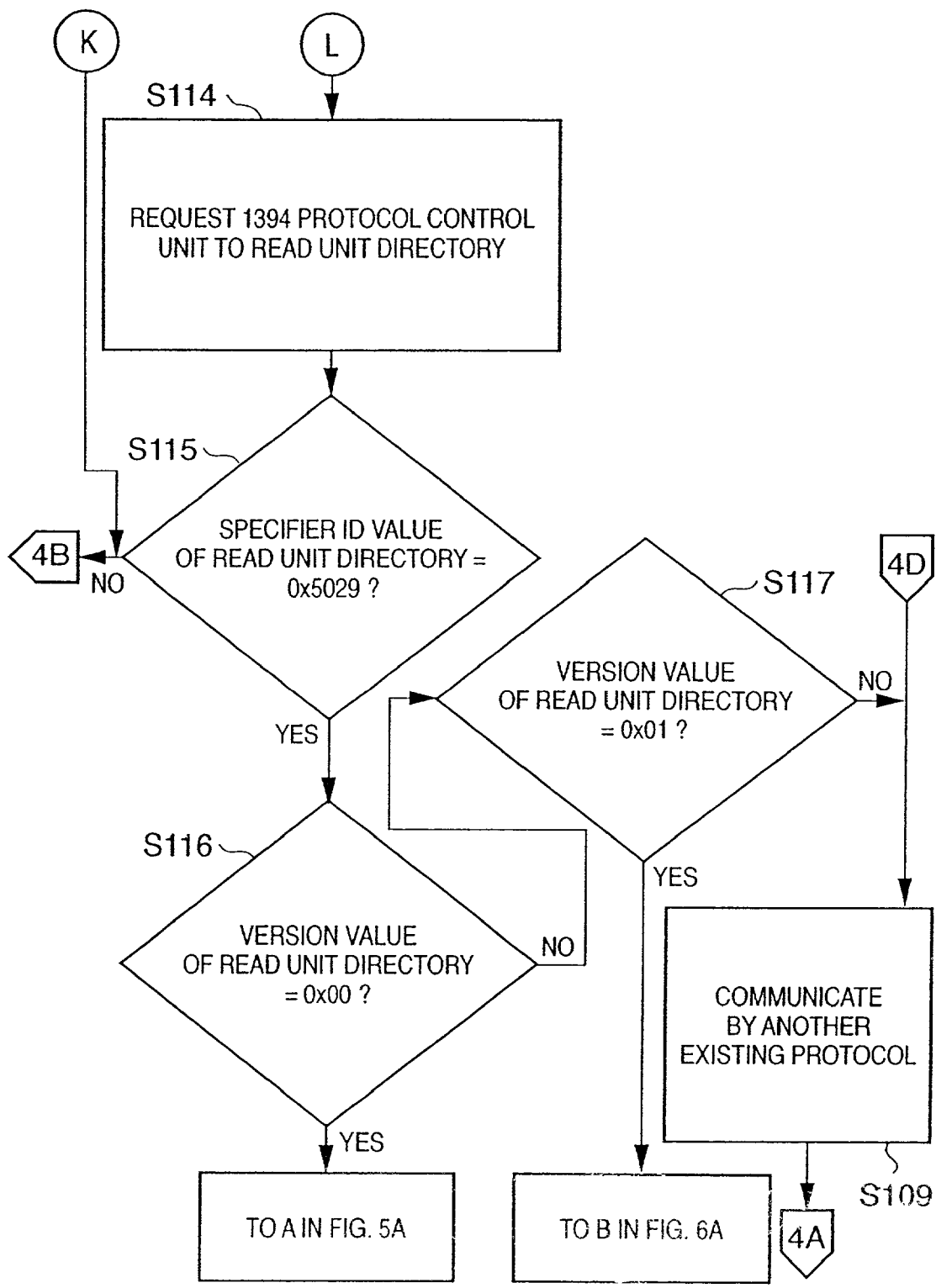

After a program for realizing the flow charts of FIGS. 4A and 4B is activated during initialization of the target device, the target waits for a connection request (connection instruction) accompanied by parameters which designate a physical device, logical device, and service from an application (S101). If the target receives such a connection request, the target instructs the 1394 line control unit 5 to list all physical devices (physical nodes) connected by a 1394 line (S102). Note that the 1394 protocol control unit in FIGS. 4A and 4B means the 1394 line control unit.

The 1394 line control unit 5 reads currently connected physical device names via the IEEE 1394 line (S103). The target receives a list of currently connected physical devices from the 1394 line control unit 5, and checks whether a physical device designated by the application is included in the list (S104). If NO in S104, the target notifies the application of the absence of the designated physical device (S106), and returns to S101.

If YES in S104, the target requests the 1394 line control unit 5 to read the root directory of the physical device (S105). The target inspects the root directory to check whether the root directory read by the 1394 line control unit 5 still has the entry of an instance directory whose attribute has not been examined yet (S107).

If the entries of all instance directories have been examined, the target checks whether MODELFLG is ON or OFF (S108). If MODELFLG is ON, the target can perform communication (connection) by a method other than the method of the present invention, and if possible, tries connection by another communication protocol (e.g., FCP) (FIG. 4B: S109). Thereafter, the target advances to S101. If MODELFLG is OFF, the target notifies the application of the absence of the designated logical device (S106), and returns to S101.

If the entries of unexamined instance directories exist in the root directory read by the 1394 line control unit 5 in step S107, the target requests the 1394 line control unit 5 to read an instance directory having the smallest address (S110). Then, the target checks whether the model written in the model entry of the instance directory read by the 1394 line control unit 5 coincides with a logical device to which the application has issued the connection request (S111). If NO in S111, the target returns to S107; if YES, turns on MODELFLG (S112). MODELFLG is initialized to "OFF" when the program which describes the procedures in FIGS. 4A and 4B is activated.

The target checks whether the entries of unexamined unit directories exist in the instance directory read by the 1394 line control unit 5 (S113). If the entries of all unit directories have been examined, the target determines that the current instance directory does not comply with procedures (protocol) defined by the embodiment, and advances to step S107.

If the entries of unexamined unit directories exist in the instance directory read by the 1394 line control unit 5, the target requests the 1394 line control unit 5 to read a unit directory having the smallest address (S114). Then, the target checks whether the value of the specifier ID item of the unit directory read by the 1394 line control unit 5 is 0×5029 (identifier of the group which defines IEEE 1394.3) (S115). If NO in S115, the target determines that the unit directory does not support IEEE 1394, and shifts to S107.

If YES in S115, the target checks the version entry value of the unit directory read by the 1394 line control unit 5 (S116). If the version entry value of the unit directory is 0×00, the target determines that the unit directory completely complies with IEEE 1394.3, and advances to A in FIG. 5A. If the version entry value of the unit directory is 0×01 (S117), the target determines that the unit directory complies with extended IEEE 1394.3 procedures defined by the embodiment, and shifts to B in FIG. 6A. If the version entry value of the unit directory is not 0×00 or 0×01, the target can perform communication by another protocol, and if possible, executes the processing (S109).

In this way, the target can acquire a hierarchical structure representing the resource of the initiator, and determine whether the target requires the resource.

<Operation of Target According to Present Invention>

Figures 1, 6A:
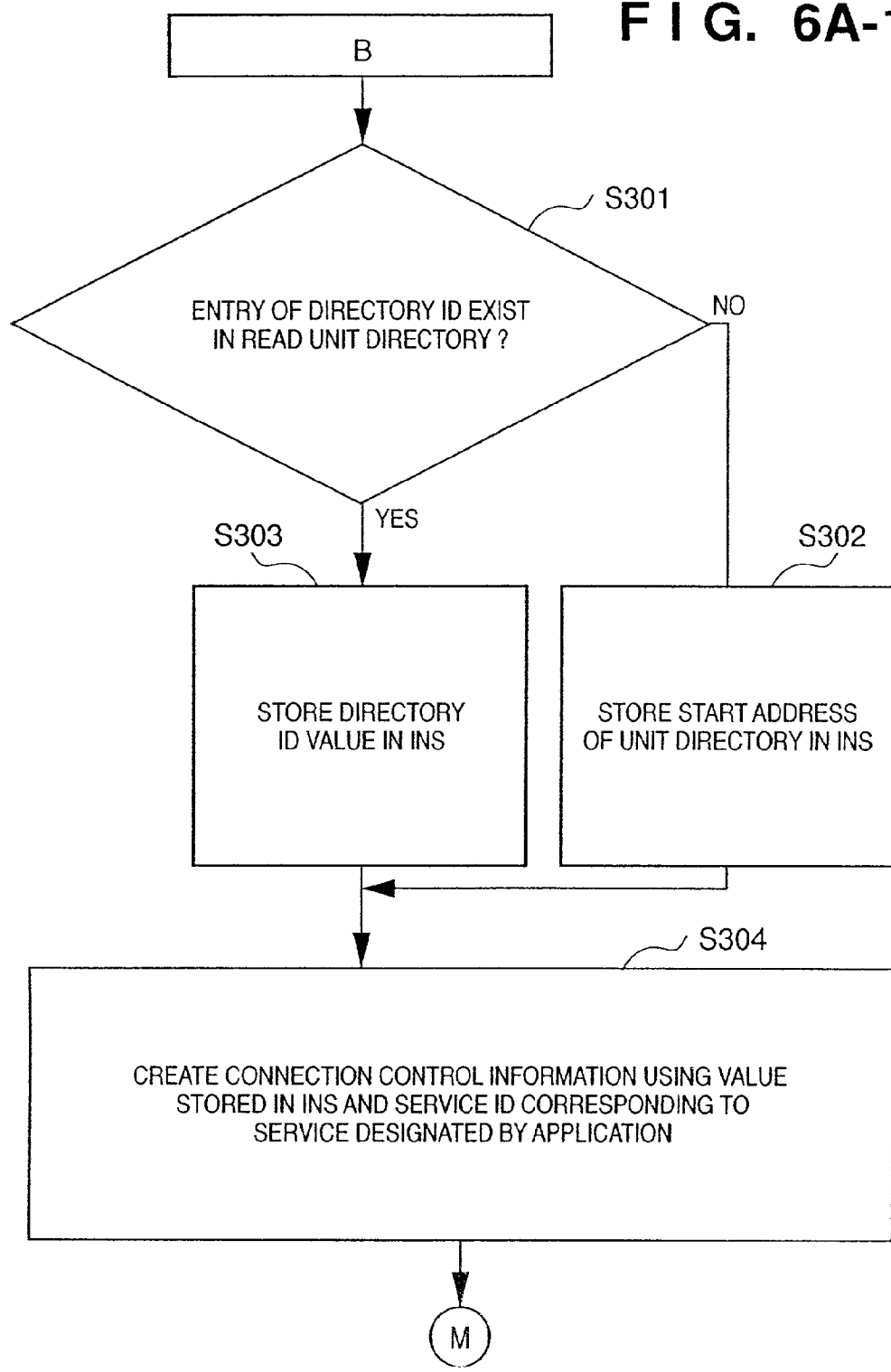
FIG. 6A is a flow chart showing the operation of the target to which the present invention is applied.
Figures 2, 6A:
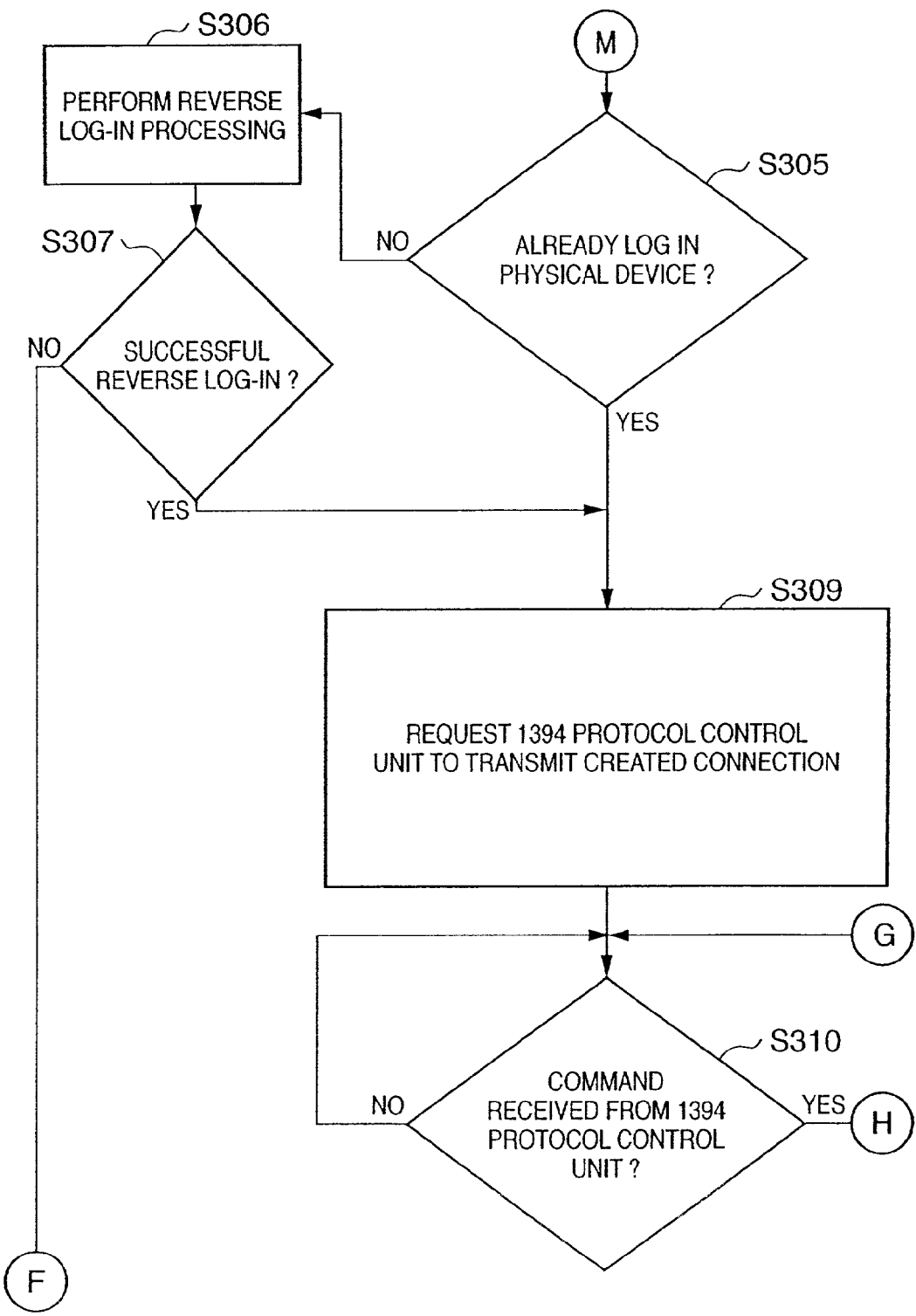
Figure 6B:
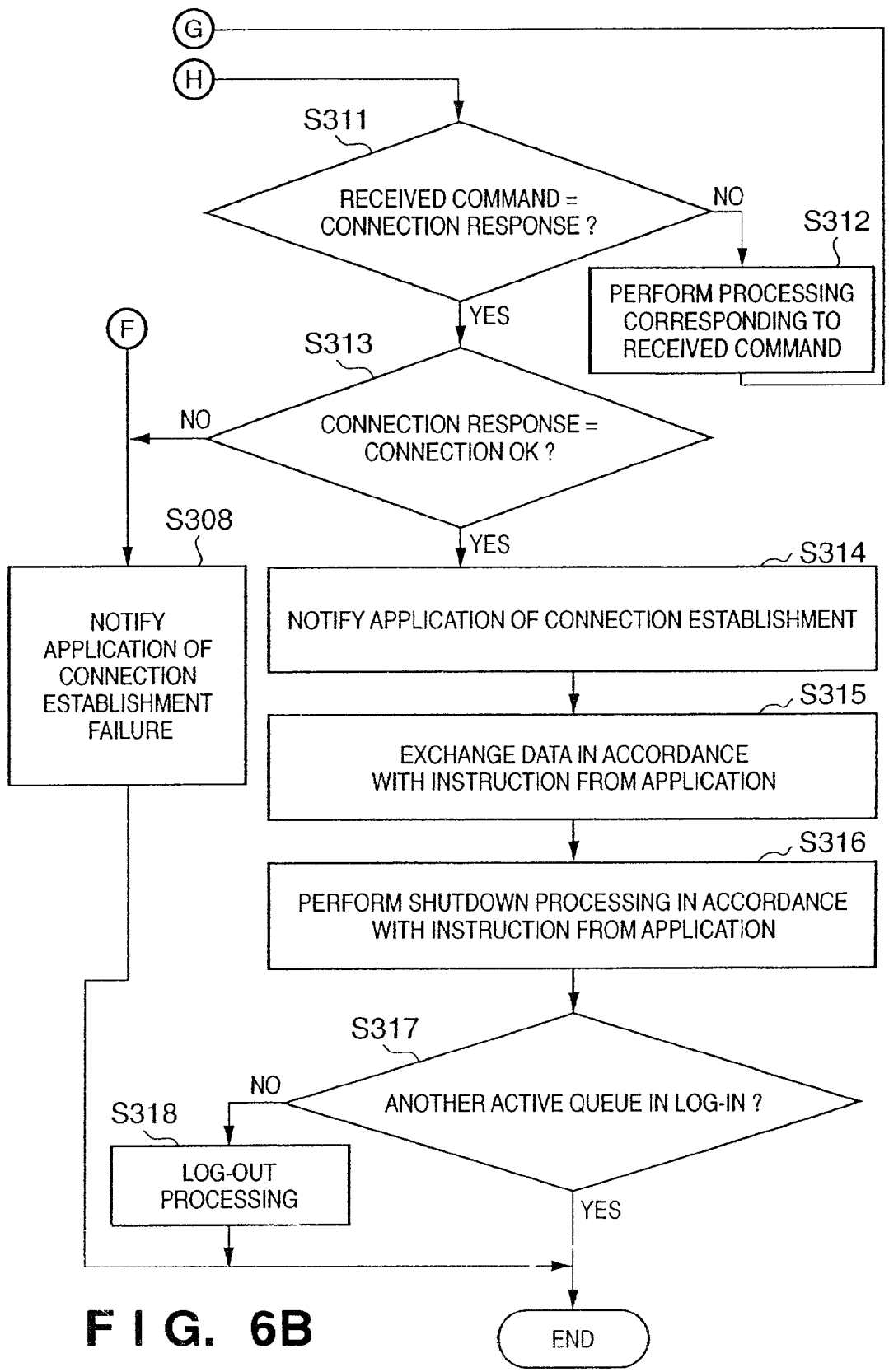
FIG. 6B is a flow chart showing the operation of the target to which the present invention is applied.

The operation of the target according to the present invention in which the unit directory complies with the extended standard of IEEE 1394.3 will be explained with reference to FIGS. 6A and 6B.

The target checks whether a read unit directory contains the entry of a directory ID (S301). If YES in S301, the target stores the value in INS (directory identifier storage location) (S303); if NO, stores the start address of the read unit directory in INS (S302).

Figure 9:
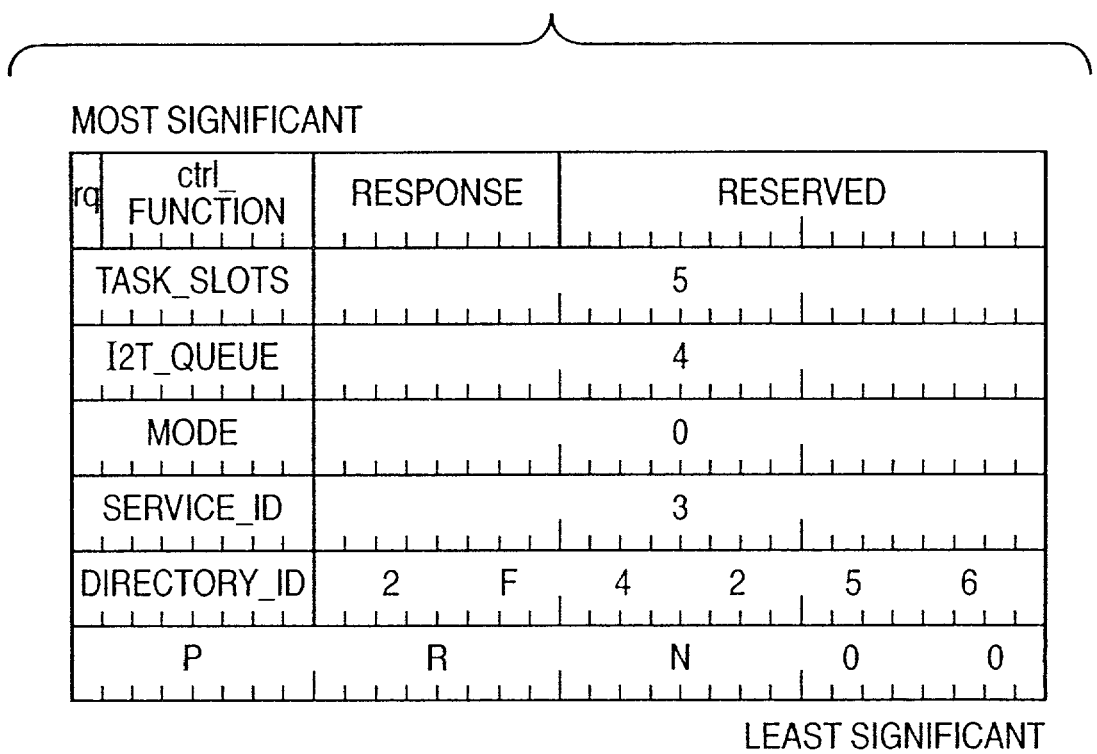
FIG. 9 is a view showing the structure of the connection control function (CONNECT) request extended from the IEEE 1394.3 definition in order to apply the present invention.

The target generates a connection control request containing a service ID corresponding to a service designated by an application and a directory ID assembled in the unit directory stored in INS (S304). The connection control request is shown in FIG. 9. More specifically, the value of the first Rq field is "1" representing a request, and that of the ctrl_function field is "CONNECT" representing connection. The response field represents a request, and its value is arbitrary. The remaining fields are as shown in FIG. 9. In this case, the service ID of the connection control request is "PRN" (print), and DIRECTORY_ID is 2F4256. The definition of DIRECTORY_ID is shown in FIG. 14. DIRECTORY_ID shows a value which specifies a unit directory in an initiator which the target tries to connect.

The target checks whether log-in with the physical device of the initiator by SBP-2 has been established (S305). If NO in S305, the target requests the 1394 line control unit 5 to perform IEEE 1394.3 reverse log-in processing (S306). The target confirms whether log-in has been established by reverse log-in (S307). If NO in S307, the target notifies the application of a connection failure, and advances to step S308.

If YES in S305 or S307, the target requests the 1394 line control unit 5 to transmit the connection control request (to be also simply referred to as connection) to the initiator by an IEEE 1394.3 method (S309). The 1394 line control unit 5 waits for a command from the physical device of the initiator (S310). If the 1394 line control unit 5 receives a command from the physical device of the initiator, the target checks whether the command is a response to the connection (to be also simply referred to as a connection response) (S311). If the connection response is OK, the values shown in FIG. 11 are sent back as a response. That is, the value "0" of the Rq field, the value "CONNECT" of the ctrl_function field, and the value "0" (representing "OK") of the response field are sent back.

If the command is not a response to the connection control request, the target performs processing corresponding to the command (S312). If the command is a connection response, the target determines from the response item whether the result is connection OK or NG (failure) (S313). If the connection is NG, the target notifies the application of a connection failure, and shifts to step S308; if the connection is OK, notifies the application that the service requested by the application can be utilized (S314). The target exchanges data in accordance with an instruction from the application (S315), and executes shutdown processing in accordance with an instruction from the application (S316).

The target checks whether another active queue exists in log-in (S317). If NO in S317, the target requests the 1394 line control unit 5 to perform log-out processing (S318), and ends the processing; if YES, directly ends the processing.

<Operation of Target Complying with IEEE 1394.3>

Figure 5A:
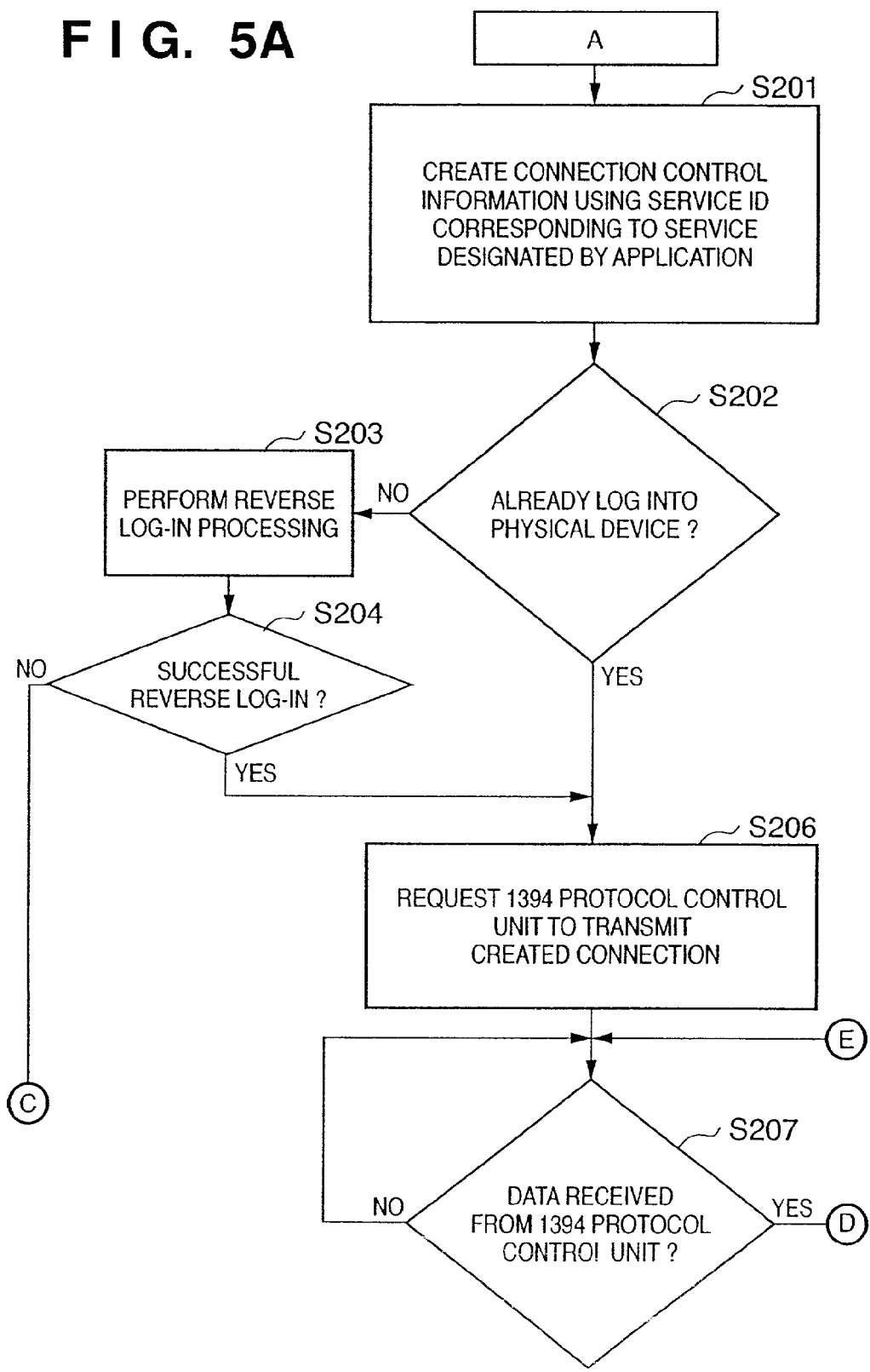
FIG. 5A is a flow chart showing the operation of the target to which the present invention is applied.

The operation of the target when the unit directory complies with IEEE 1394.3 will be described with reference to FIGS. 5A and 5B.

Figure 8:
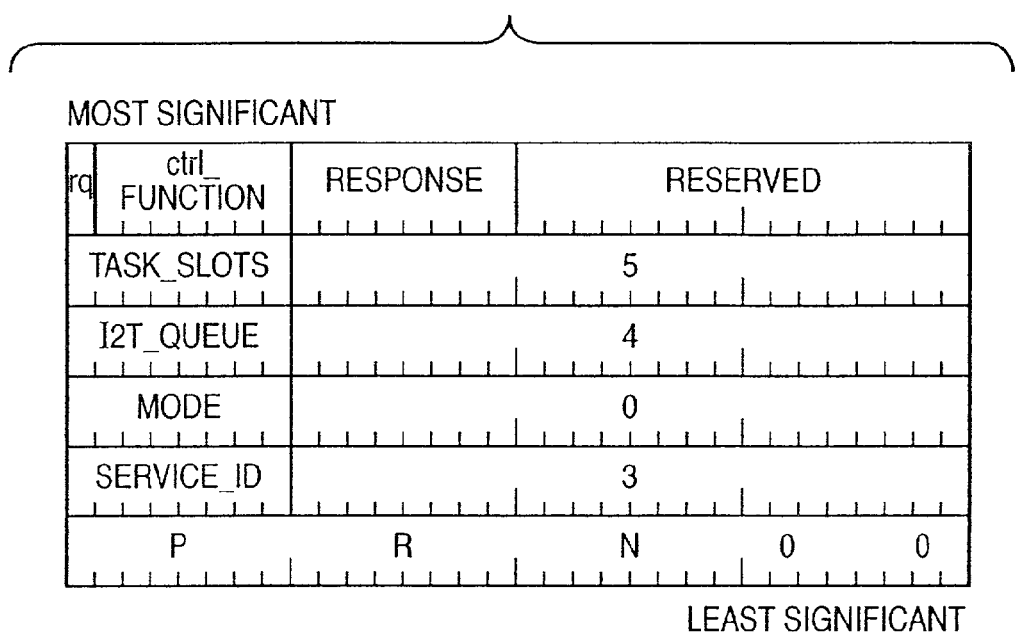
FIG. 8 is a view showing the structure of a connection control function (CONNECT) request defined by IEEE 1394.3.

The target generates a connection control request in which a service ID corresponding to a service designated by an application is assembled (S201). The contents of the connection control request are shown in FIG. 8. The cntrl_function field contains "CONNECT" representing the connection control request. The remaining fields are as shown in FIG. 8. In this case, the service ID is "PRN".

The target checks whether log-in with the physical device of the initiator by SBP-2 has been established (S202). If NO in S202, the target requests the 1394 line control unit 5 to perform IEEE 1394.3 reverse log-in processing (S203). The target confirms whether log-in has been established by reverse log-in (S204). If NO in S204, the target notifies the application of a connection failure, and advances to step S205.

If YES in S202 or S204, the target requests the 1394 line control unit 5 to transmit the connection control request generated in step S201 to the initiator by an IEEE 1394.3 method (S206). The 1394 line control unit 5 waits for a command from the physical device of the initiator (S207). If the 1394 line control unit 5 receives a command from the physical device of the initiator, the target checks whether the command is a connection response (S208).

If YES in S208, the target sends back a response in FIG. 11; if NO, performs processing corresponding to the command (S209). If the command is a connection response, the target determines from the response item whether the result is connection OK or NG (failure) (S210). If the connection is NG, the target notifies the application of a connection failure, and shifts to step S205; if the connection is OK, notifies the application that the service requested by the application can be utilized (S211). The target exchanges data in accordance with an instruction from the application (S212), and executes shutdown processing in accordance with an instruction from the application (S213).

The target checks whether another active queue exists in log-in (S214). If NO in S214, the target requests the 1394 line control unit 5 to perform log-out processing (S215), and ends the processing; if YES, directly ends the processing.

<Operation of Initiator>

Figures 1, 7A:
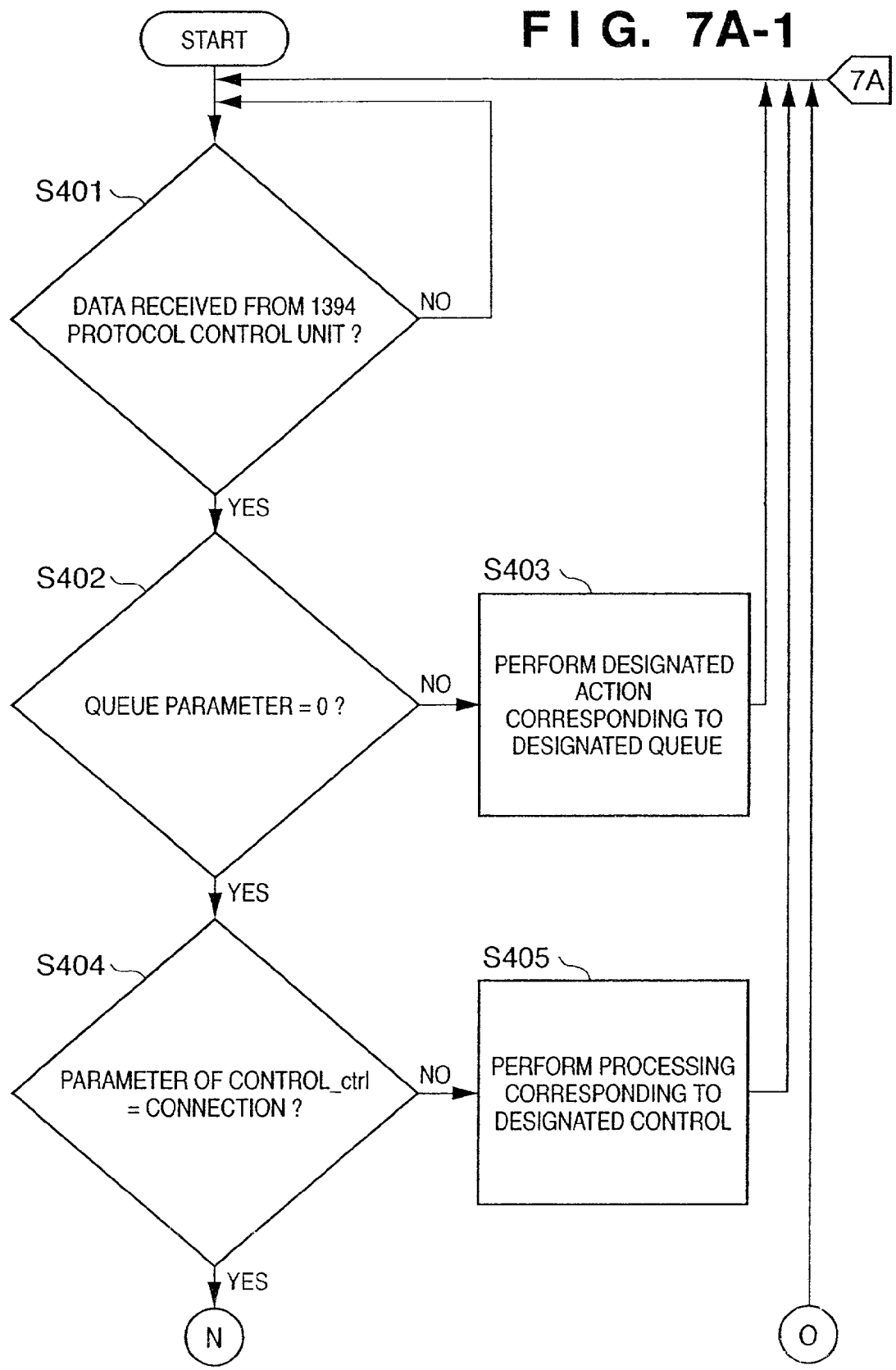
FIG. 7A is a flow chart showing the operation of the initiator to which the present invention is applied.
Figures 2, 7A:
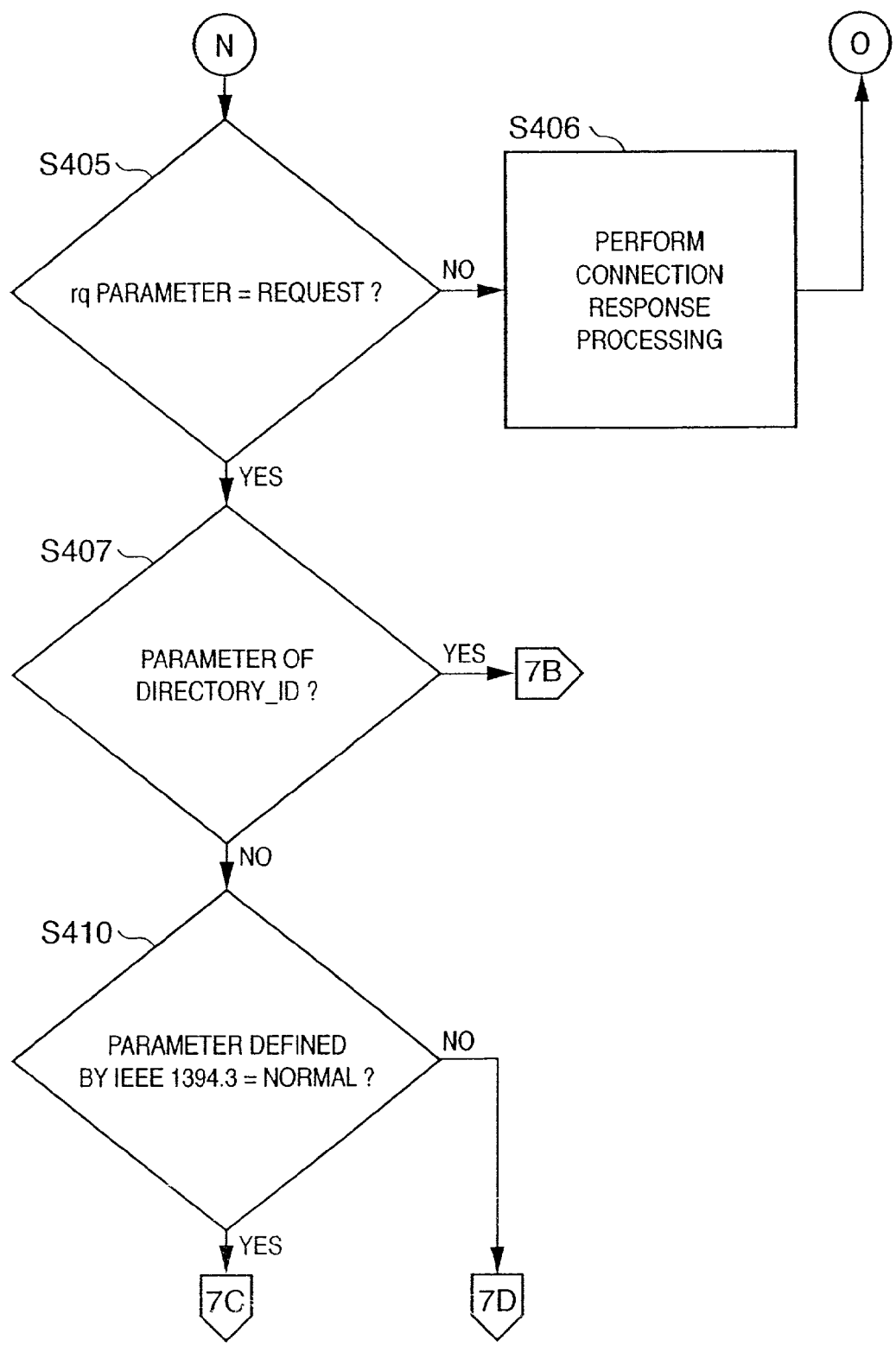
Figures 1, 7B:
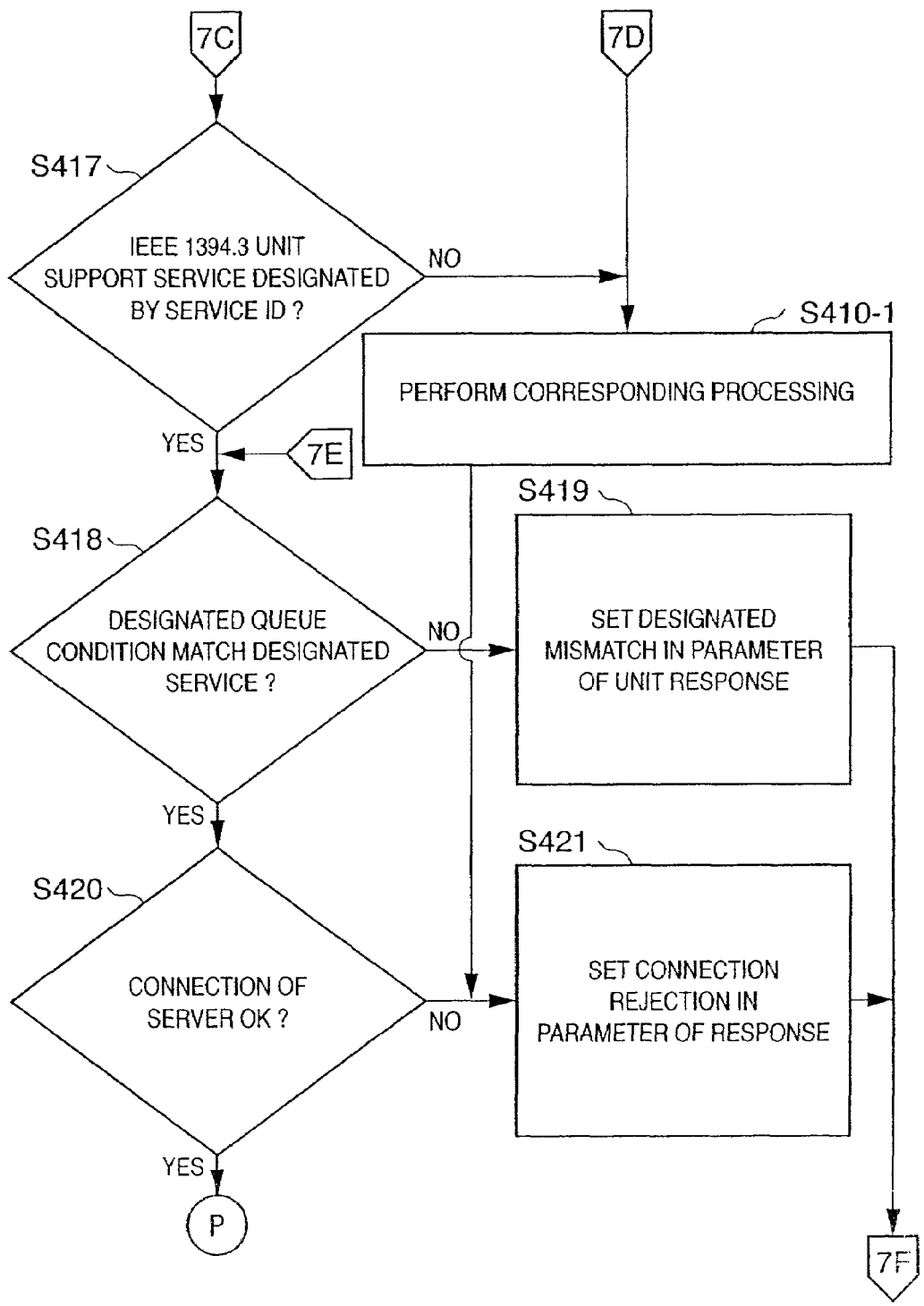
FIG. 7B is a flow chart showing the operation of the initiator to which the present invention is applied.
Figures 2, 7B:
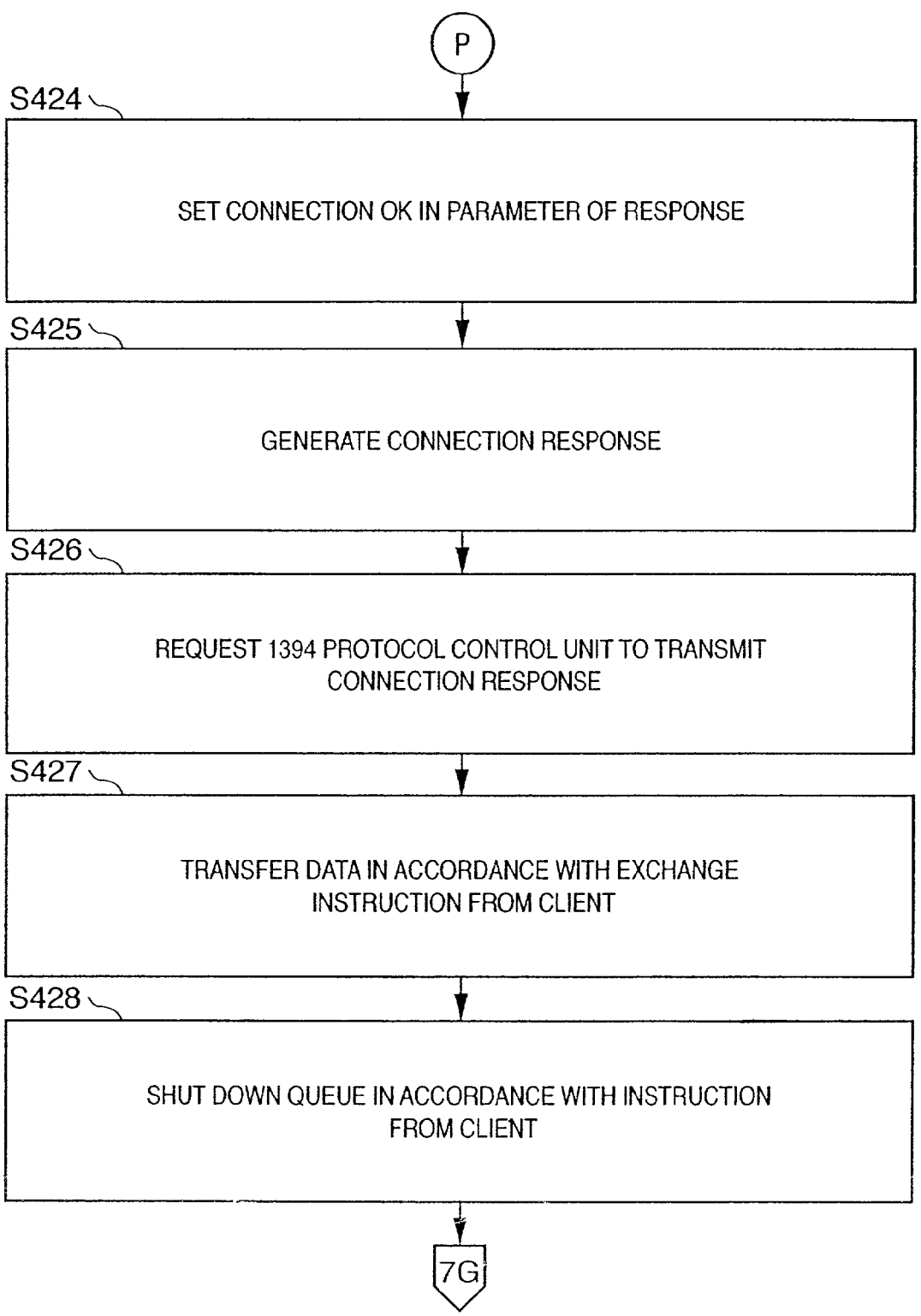
Figures 1, 7C:
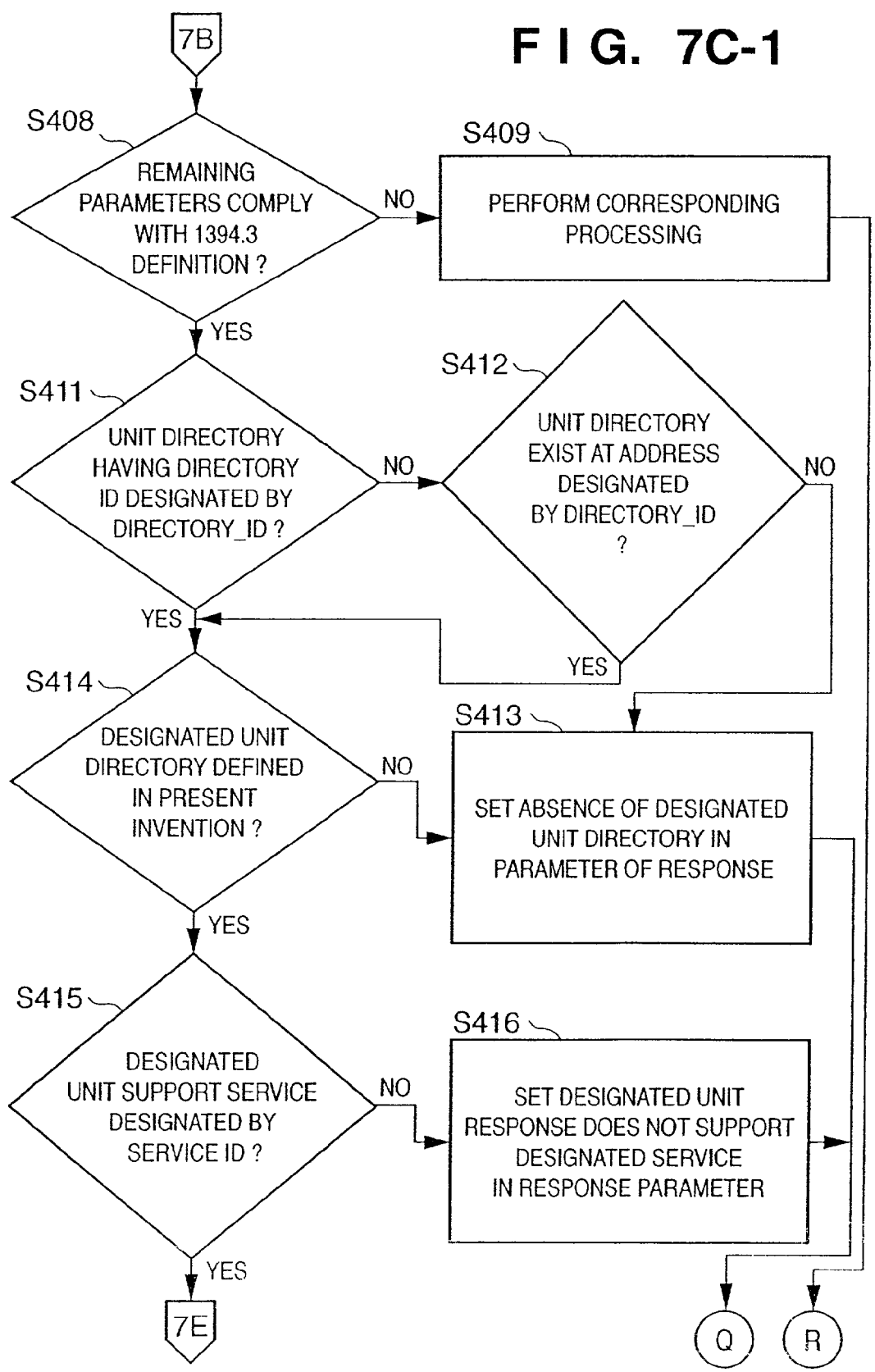
FIG. 7C is a flow chart showing the operation of the initiator to which the present invention is applied.
Figures 2, 7C:
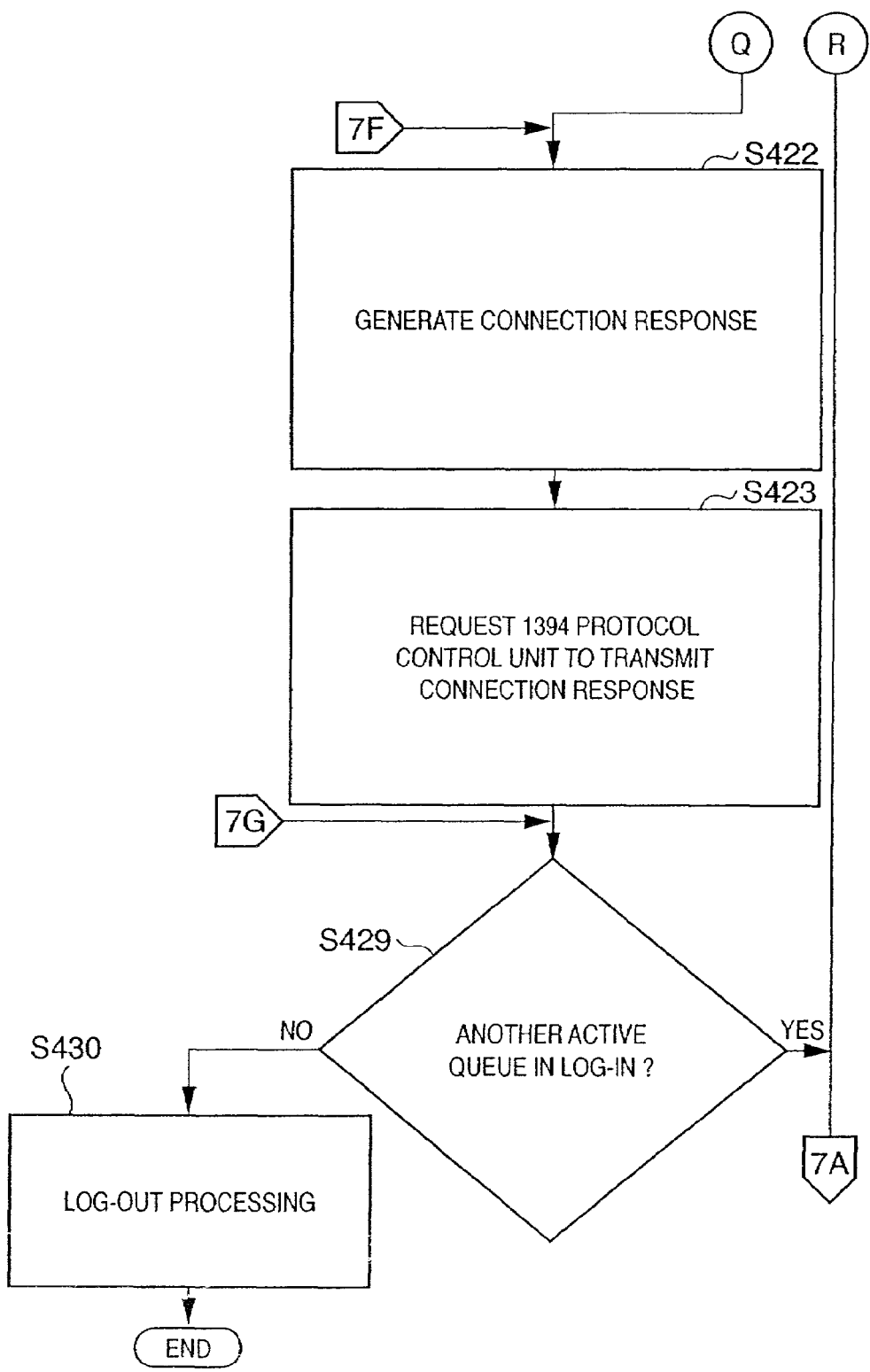

The operation of the initiator according to the present invention will be explained with reference to FIGS. 7A to 7C. The initiator is activated and initialized simultaneously when devices including the present invention are initialized. Log-in operation defined by SBP-2 is controlled by the 1394 line control unit 15 and is not described in detail.

The initiator waits until the 1394 line control unit 15 receives data concerning the present invention from a target device (S401). The initiator examines the queue item (defined by IEEE 1394.3) of a corresponding ORB to check whether the received data relates to queue 0 (S402). If NO in S402, the initiator executes processing (defined by IEEE 1394.3) corresponding to the queue number (S403), and advances to S401.

If YES in S402, the initiator checks whether the cntrl_function item (see FIGS. 8 and 9) of control information represents connection (S404). If NO in S404, the initiator performs processing (defined by IEEE 1394.3) corresponding to the designated control function (S405-1), and shifts to S401.

If YES in S404, the initiator checks the Rq item of the control information (S405-2). If the Rq item represents a response, the initiator performs corresponding processing (defined by IEEE 1394.3) (S406), and advances to S401.

If the Rq item of the control information represents a request, the initiator checks whether a DIRECTORY_ID item (see FIGS. 8, 9, and 14) exists in the control information (S407).

If YES in S407, the initiator checks whether the remaining parameters comply with those defined by the IEEE 1394.3 connection control (S408). If NO in S408, the initiator performs corresponding error processing (S409), and shifts to S401.

Figure 12:
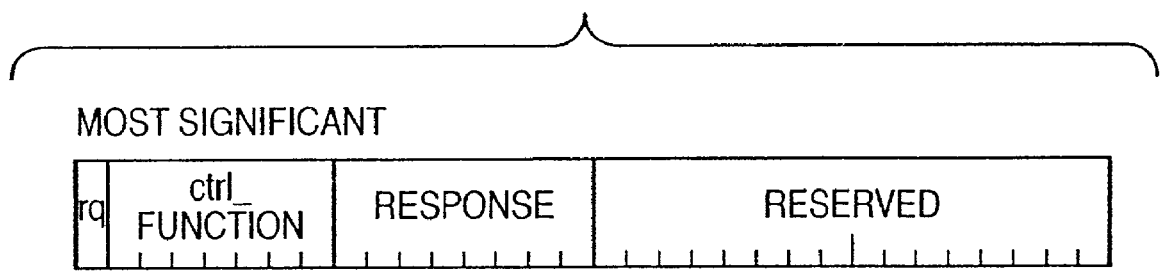
FIG. 12 is a view showing the structure of the connection control function (CONNECT) response extended from the IEEE 1394.3 definition in the present invention when a designated unit directory does not exist.

If YES in S408, the initiator checks whether a unit directory having the same directory ID as the directory ID designated in the DIRECTORY_ID item exists in the initiator (S411). If NO in S411, the initiator checks whether a unit directory having the DIRECTORY_ID value at the start address exists in the initiator (S412). If NO in S412, the initiator sets "the designated unit does not exist." in the parameter of the connection response (see FIGS. 15 and 12) (S413), and shifts to S422.

In step S422, the initiator generates a connection response containing the designated connection response parameter. Then, the initiator requests the 1394 line control unit 15 to transmit the generated connection response (S423), and advances to S429.

Figure 23:
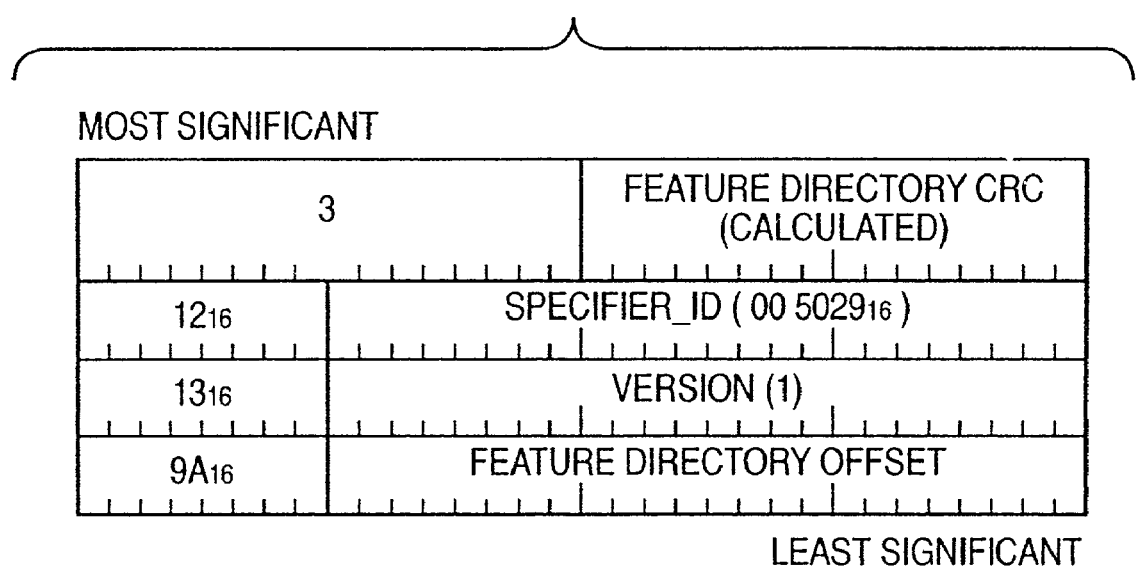
FIG. 23 is a view showing the structure of a unit directory to which the present invention is applied.

If YES in S411 or S412, the initiator checks whether the unit directory designated by DIRECTORY_ID has the contents of the directory as shown in FIG. 17 (S414). If NO in S414, the initiator sets "the designated unit does not exist." in the parameter of the connection response (see FIGS. 15 and 12) (S413), and shifts to S422. FIG. 17 shows the contents of the unit directory according to the present invention. The entries of the specifier ID and version are essential, and the directory ID and the feature directory which defines a providable service are added, as needed. FIG. 23 shows codes corresponding to the respective entries. As shown in FIG. 23, the specifier ID is represented by 12 (hexadecimal number); the version, 13 (hexadecimal number); and the feature directory offset, 9A (hexadecimal number). The entries of the specifier ID and version are fixed to 005029 (hexadecimal number) and 000001 (hexadecimal number), respectively.

Figure 13:
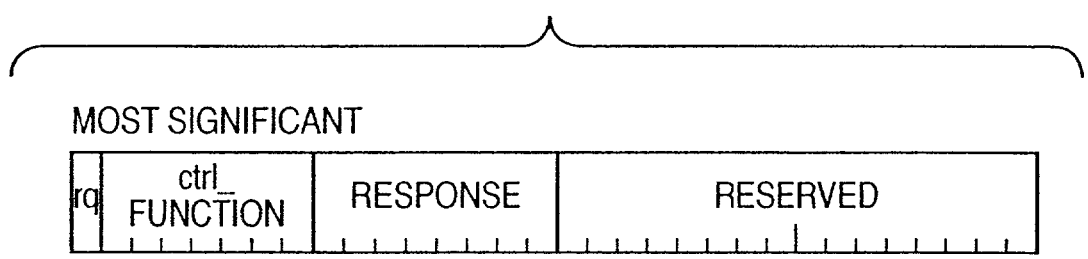
FIG. 13 is a view showing the structure of the connection control function (CONNECT) response extended from the IEEE 1394.3 definition in the present invention when a unit directory designated to provide a designated service does not exist.

If the unit directory designated by DIRECTORY_ID has the contents of the directory described in this embodiment, i.e., entries as shown in FIG. 17 in step S414, the initiator checks whether a service requested by the service ID designated by the connection control is supported by a unit (logical device) corresponding to the unit directory represented by the designated DIRECTORY_ID (S415). If NO in S415, the initiator sets "the designated unit does not support the designated service." in the parameter of the connection response (see FIGS. 15 and 13) (S416), and advances to S422.

If NO in S407, the initiator checks whether the parameters comply with those defined by the IEEE 1394.3 connection control (S410). If NO in S410, the initiator performs corresponding error processing, and shifts to S421; if YES, checks whether the initiator supports a service requested by the service ID designated by the connection control (S417).

Figure 10:
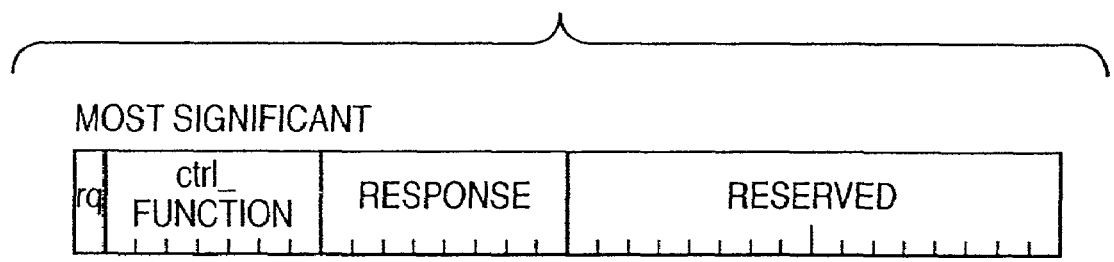
FIG. 10 is a view showing the structure of a connection control function (CONNECT) response defined by IEEE 1394.3 when a service mismatches the type of designated queue.

If YES in S417, the initiator checks whether the contents and number of queues required by the service requested by the service ID designated by the connection control coincide with those designated in the queue field of the connection control (S418). If NO in S418, the initiator sets "mismatch" in the parameter of the connection response (see FIGS. 15 and 10) (S419), and advances to S422.

If YES in S418, the initiator checks whether the service-requested server provides the designated service (S420). If NO in S420, the initiator sets "connection rejection" in the parameter of the connection response (see FIGS. 15 and 19) (S421), and advances to S422.

If YES in S420, the initiator sets "connection OK" in the parameter of the connection response (see FIGS. 15 and 11) (S424), and shifts to S425.

Then, the initiator generates a connection response containing the designated connection response parameter (S425). The initiator requests the 1394 line control unit 15 to transmit the generated connection response (S426). The initiator and target exchange data via the 1394 line control unit 15 by an IEEE 1394.3 method in accordance with a request from a client (S427). After the service ends, the initiator performs shutdown processing by an IEEE 1394.3 method in accordance with a request from the client (S428). Note that the client is an application which requests a service of the initiator via the target. Processes in steps S427 and S428 are executed in correspondence with processes in steps S212 and S213 in FIG. 5B or processes in steps S315 and S316 in FIG. 6B. In step S427, data are exchanged, and the initiator provides the service designated by the target. At this time, if a logical device managed by the initiator and a service supported by the logical device are designated, the service designated by the designated logical device is provided.

For example, if the address of the unit directory 303 of logical printer B in FIG. 3B, and "print" which is a service supported by logical printer B are designated by the DEVICE_ID field of a connection control function issued from the target to the initiator, connection is established between the target and the initiator. After that, the initiator provides a buffer to the target, reads data written in the buffer by the target, and executes the service "print" on the basis of the data.

The initiator checks whether an active queue other than queue 0 exists in log-in (S429). If YES in S429, the initiator shifts to S400; if NO, performs log-out processing defined by SBP-2 and ends the processing (S430).

If NO in step S410 or S417, the initiator performs corresponding processing (S410-1), and advances to step S419.

By these procedures, the config ROM in the initiator manages services usable in logical devices for each logical device of the initiator. Connection between the target and the initiator can be established by designating a logical device and service of the initiator by the target. The target can receive the service from the designated logical device.

With the above arrangement and procedures, the relationship between instances and services can be expressed when one node functioning as an initiator defined by IEEE 1394.3 has a plurality of instances. Even if a plurality of instances in one node provide services having the same service ID, which of the instances provides a service represented by the service ID can be specified by designating at least the directory ID of the feature directory or unit directory whose service ID is stored.

Another node which is connected by a line and supports the present invention can understand which instance provides a service on public view by a service ID. More specifically, the present invention can cope with a multi-functional peripheral device and the like.

Even if a unit directory defined as an initiator unit directory by the existing IEEE 1394.3 and a unit directory defined by the present invention exist mixedly, downward compatibility with the existing IEEE 1394.3 can be achieved though this is limited to only one instance per node.

Second Embodiment

Figure 24:
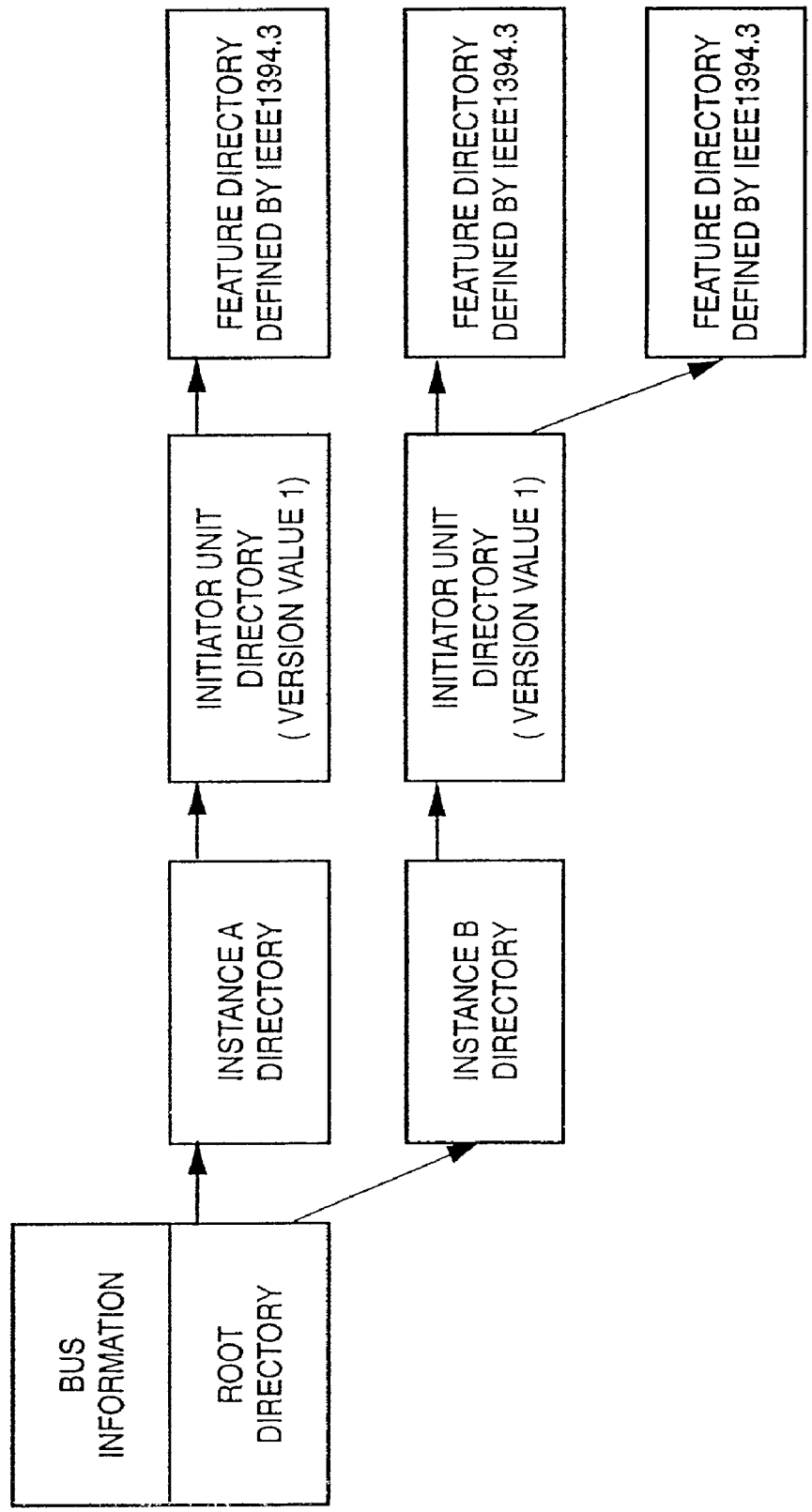
FIG. 24 is a block diagram showing the schematic hierarchy of a config ROM mounted in an initiator according to the second embodiment.

The first embodiment has exemplified the case in which only unit directories defined by the present invention exist. The second embodiment will describe an example in which a unit directory defined as an initiator unit directory by the existing IEEE 1394.3 and a unit directory defined by the present invention exist mixedly. FIG. 24 is a block diagram showing a hierarchical structure in the second embodiment.

This structure enables downward compatibility with the existing IEEE 1394.3 though this is limited to only one instance per node.

Industrial Applicability

As has been described above, the relationship between instances and services can be expressed when one node functioning as an initiator defined by IEEE 1394.3 has a plurality of instances. Even if a plurality of instances in one node provide services having the same service ID, which of the instances provides a service represented by the service ID can be specified by designating at least the directory ID of the feature directory or unit directory whose service ID is stored.

Accordingly, another node which is connected by a line and supports the present invention can understand which instance provides a service on public view by a service ID. More specifically, the present invention can cope with a multifunctional peripheral device and the like.

Even if a unit directory defined as an initiator unit directory by the existing IEEE 1394.3 and a unit directory defined by the present invention exist mixedly, downward compatibility with the existing IEEE 1394.3 can be achieved though this is limited to only one instance per node.

What is claimed is:

1. A communication control apparatus which functions as an initiator and communicates with an external device functioning as a target in the IEEE 1394.3, comprising:
   a storage unit, configured to store information expressing a plurality of functions that the communication control apparatus is capable of providing and storing a plurality of unit directories each of which corresponds to respective functions;
   a communication unit, configured to communicate data located in an address designated by the external device with the external device;
   a receiving unit, configured to receive from the external device data including a directory ID which specifies a unit directory to which the target tries to connect; and
   a determining unit, configured to determine whether a unit directory corresponding to the directory ID exists in the initiator, wherein said communication unit communicates with the external device in accordance with a method standardized in IEEE 1394.3 in a case where said determining unit determines that the unit directory corresponding to the directory ID exist in the initiator, and wherein said communication unit does not communicate with the external device in accordance with a method standardized in IEEE 1394.3 in a case where said determining unit determines that the unit directory corresponding to the directory ID does not exist in the initiator.

2. The communication control apparatus according to claim 1, wherein said storage unit stores the plurality of unit directories each of which includes an attribute depending on a communication protocol ability of the communication control apparatus, and wherein when a plurality of attributes depending on different communication protocol abilities are to be described, each of the plurality of attributes is described in each of the plurality of unit directories stored in said storage unit.

3. The communication control apparatus according to claim 2, wherein the attribute is described in a version item of the unit directory defined by IEEE 1212R.

4. The communication control apparatus according to claim 1, wherein the plurality of unit directories include a unit directory in which a plurality of items including a version item is described in accordance with the IEEE 1394.3, and a unit directory in which the version item among the plurality of items has a specific value different from the IEEE 1394.3 definition and another remainder of the plurality of items is described in accordance with the IEEE 1394.3.

5. A communication control apparatus functioning as an initiator for providing a service requested by an external device functioning as a target in IEEE 1394.3, comprising:

a plurality of services; and a storage unit, configured to store a plurality of unit directories so as to enable reading of the plurality of unit directories by the external device, wherein each of the plurality of unit directories corresponds to respective functions that the communication control apparatus is capable of providing;

a receiving unit, configured to receive from the external device data including a directory ID which specifies a unit directory to which the target tries to connect;

a determining unit, configured to determine whether a unit directory corresponding to the directory ID exists in the initiator; and a communication unit, configured to communicate with the external device in accordance with a method standardized in IEEE 1394.3 in a case where said determining unit determines that the unit directory corresponding to the directory ID exists in the initiator, and not to communicate with the external device in accordance with a method standardized in IEEE 1394.3 in a case where said determining unit determines that the unit directory corresponding to the directory ID does not exist in the initiator.

6. A communication control method of communicating by an initiator with a target functioning in the IEEE 1394.3, said method comprising the steps of:

storing information expressing a plurality of functions that the initiator is capable of providing and a plurality of unit directories each of which corresponds to respective functions;

communicating data located in an address designated by the target with the target;

receiving from the target data including a directory ID specifying a unit directory to which the target tries to connect:

determining whether a unit directory corresponding to the directory ID exists in the initiator; and communicating with the target in accordance with a method standardized in IEEE 1394.3 in a case where the determining step determines that the unit directory corresponding to the directory ID exists in the initiator, and wherein the initiator does not communicate with the target in accordance with a method standardized in IEEE 1394.3 in a case where the determining step determines that the unit directory corresponding to the directory ID does not exist in the initiator.

7. The communication control method according to claim 6, further comprising a step of storing the plurality of unit directories each of which includes an attribute depending on a communication protocol ability of the communication control protocol, and wherein when a plurality of attributes depending on different communication protocol abilities are to be described, each of the plurality of attributes can be described in each of the plurality of unit directories stored in said initiator.

8. The communication control method according to claim 7, wherein the attribute is described in a version item of the unit directory defined by IEEE 1212R.

9. The communication control method according to claim 6, wherein the plurality of unit directories include a unit directory in which a plurality of items including a version item is described in accordance with the IEEE 1394.3, and a unit directory in which the version item among the plurality of items has a specific value different from the IEEE 1394.3 definition and remainder of the plurality of items is described in accordance with the IEEE 1394.3.

* * * * *

UNITED STATES PATENT AND TRADEMARK OFFICE
CERTIFICATE OF CORRECTION

PATENT NO. : 7,363,405 B2
APPLICATION NO. : 10/185233
DATED : April 22, 2008
INVENTOR(S) : Takashi Isoda It is certified that error appears in the above-identified patent and that said Letters Patent is hereby corrected as shown below:

<u>COLUMN 1</u>:
  Line 23, "bus" should read -- bus, --; and
  Line 23, "interface" should read -- interface, --.

<u>COLUMN 3</u>:
  Line 58, "comprising" should read -- comprising: --;
  Line 62, "service providing" should read -- service-providing --; and
  Line 67, "service providing" should read -- service-providing --.

<u>COLUMN 5</u>:
  Line 13, "diagram" should read -- diagram showing --.

<u>COLUMN 7</u>:
  Line 52, "turns" should read -- the target turns --.

<u>COLUMN 8</u>:
  Line 29, "stores" should read -- the target stores --.

<u>COLUMN 9</u>:
  Line 8, "notifies" should read -- the target notifies --;
  Line 16, "directly" should read -- the target directly --;
  Line 45, "performs" should read -- the target performs --;
  Line 51, "notifies" should read -- the target notifies --; and
  Line 59, "directly" should read -- the target directly --.

<u>COLUMN 11</u>:
  Line 8, "checks" should read -- the initiator checks --; and
  Line 55, "performs" should read -- the initiator performs --.

<u>COLUMN 12</u>:
  Line 35, "provide" should read -- provides --.

UNITED STATES PATENT AND TRADEMARK OFFICE
CERTIFICATE OF CORRECTION

PATENT NO.        : 7,363,405 B2
APPLICATION NO.   : 10/185233
DATED             : April 22, 2008
INVENTOR(S)       : Takashi Isoda It is certified that error appears in the above-identified patent and that said Letters Patent is hereby corrected as shown below:

<u>COLUMN 13</u>:
      Line 5, "exist" should read -- exists --; and
      Line 37, "and" should be deleted.

<u>COLUMN 14</u>:
      Line 18, "connect:" should read -- connect; --.

Signed and Sealed this

Fourteenth Day of April, 2009

JOHN DOLL
*Acting Director of the United States Patent and Trademark Office*